(12) United States Patent
Hamze

(10) Patent No.: US 12,387,103 B2
(45) Date of Patent: Aug. 12, 2025

(54) BACKPROPAGATION USING PARAMETRIZING ANGLES OF UNITARY MATRIX

(71) Applicant: Microsoft Technology Licensing, LLC, Redmond, WA (US)

(72) Inventor: Firas Hamze, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 1128 days.

(21) Appl. No.: 17/318,977

(22) Filed: May 12, 2021

(65) Prior Publication Data

US 2022/0374718 A1 Nov. 24, 2022

(51) Int. Cl.
*G06N 3/084* (2023.01)
*G06F 17/16* (2006.01)

(52) U.S. Cl.
CPC ............. *G06N 3/084* (2013.01); *G06F 17/16* (2013.01)

(58) Field of Classification Search
CPC ........ G06N 3/084; G06N 3/044; G06N 3/045; G06N 20/00; G06F 17/16
See application file for complete search history.

(56) References Cited

U.S. PATENT DOCUMENTS

2006/0155798 A1* 7/2006 Ketchum ............ H04L 25/0246
708/607
2018/0260703 A1* 9/2018 Soljacic ................. G06N 3/084
(Continued)

FOREIGN PATENT DOCUMENTS

| EP | 2484068 B1 * | 10/2016 | ............ G06F 17/16 |
| WO | WO-2007037716 A1 * | 4/2007 | ............ G06F 17/16 |
| WO | 2021033486 A1 | 2/2021 | |

OTHER PUBLICATIONS

Bilski, Jaroslaw, Bartosoz Kowalczyk, and Jacek M Zurada. Application of Givens Rotations in the Neural Network Algorithm. Artificial Intelligence and Soft Computing: Cham: Springer International Publishing. 46-56. Web. (Year: 2016).*

(Continued)

*Primary Examiner* — Markus A. Vasquez
(74) *Attorney, Agent, or Firm* — Alleman Hall & Tuttle LLP

(57) ABSTRACT

A computing system, including a processor configured to train a machine learning model in a plurality of backpropagation iterations. Each backpropagation iteration may include generating a coordinate pair sequence. Each coordinate pair may be unique within the coordinate pair sequence and may include non-matching coordinates. The backpropagation iteration may further include receiving parametrizing angles respectively associated with the coordinate pairs. The backpropagation iteration may further include computing a unitary matrix parametrized by the parametrizing angles, computing a loss gradient matrix, and computing a Jacobian-vector product (JVP). Computing the JVP may include computing a rotated unitary matrix and a rotated loss gradient matrix for each coordinate pair. The JVP may be computed from the rotated unitary matrix and the rotated loss gradient matrix. The backpropagation iteration may further include updating the parametrizing angles based at least in part on the JVP.

16 Claims, 18 Drawing Sheets

(56) References Cited

U.S. PATENT DOCUMENTS

2019/0354894 A1* 11/2019 Lazovich ............... G06E 1/00
2023/0368034 A1* 11/2023 Aoyama ............... G06N 3/084

OTHER PUBLICATIONS

Shutler, Paul M. E, Seok Woon Sim,k and Wei Yin Selina Lim. "Analysis of Linear Time Sorting Algorithms". Computer journal 51.4 (2008): 451-469. web. (Year: 2008).*

Dorobantu et al. "DizzyRNN: Reparameterizing Recurrent Neural Networks for Norm-Preserving Backpropagation." arXiv (Cornell University) n. pag. Web. (Year: 2016).*

Arjovsky, Martin, Amar Shah, and Yoshua Bengio. "Unitary Evolution Recurrent Neural Networks." arXiv (Cornell University) (2015): n. pag. Web. Arjowsky (Year: 2015).*

"International Search Report and Written Opinion Issued in PCT Application No. PCT/US22/024151", Mailed Date: Aug. 3, 2022, 12 Pages.

Ozay, et al., "Optimization on Submanifolds of Convolution Kernels in CNNs", In Repository of arxiv:1610.07008v1, Oct. 22, 2016, 9 Pages.

Wisdom, et al., "Full-Capacity Unitary Recurrent Neural Networks", In Repository of arXiv:1611.00035v1, Oct. 31, 2016, 9 Pages.

Paszke, et al., "PyTorch: An Imperative Style, High-Performance Deep Learning Library", In Repository of arXiv:1912.01703v1, Dec. 3, 2019, 12 Pages.

Mathieu, et al., "Fast Approximation of Rotations and Hessian Matrices", In Repository of arxiv:1404.7195v1, Apr. 29, 2014, 10 Pages.

Clements, et al., "Optimal Design for Universal Multiport Interferometers", In Journal of Optica, vol. 3, Issue 12, Dec. 6, 2016, pp. 1460-1465.

Arjovsky, et al., "Unitary Evolution Recurrent Neural Networks", In Proceedings of the 33rd International Conference on Machine Learning, vol. 48, Jun. 19, 2016, 9 Pages.

Lezcano-Casado, et al., "Cheap Orthogonal Constraints in Neural Networks: A Simple Parametrization of the Orthogonal and Unitary Group", In Proceedings of the 36th International Conference on Machine Learning, 2019, 10 Pages.

Harandi, et al., "Generalized BackPropagation, Étude De Cas: Orthogonality", In Repository of arxiv:1611.05927v1, Nov. 17, 2016, 19 Pages.

Harris, Mark, "Optimizing Parallel Reduction in CUDA", In Nvidia Developer Technology, vol. 2, Issue 4, Nov. 2007, 39 Pages.

Huang, et al., Orthogonal Weight Normalization: Solution to Optimization Over Multiple Dependent Stiefel Manifolds in Deep Neural Networks, In Proceedings of the 32nd AAAI Conference on Artificial Intelligence, vol. 32, Issue 1, Apr. 29, 2018, pp. 3271-3278.

Jing, et al., "Tunable Efficient Unitary Neural Networks (EUNN) and their Application to RNNs", In Proceedings of the 34th International Conference on Machine Learning, Jul. 17, 2017, 9 Pages.

"CUBLAS", Retrieved From: https://developer.nvidia.com/cublas, Retrieved Date: Mar. 11, 2021, 3 Pages.

"NVIDIA Cuda Toolkit 10.2.89", Retrieved From: https://docs.nvidia.com/cuda/archive/10.2/pdf/CUDA_Toolkit_Release_Notes.pdf, Nov. 2020, 16 Pages.

Kirkman, T. P., "On a Problem in Combinations", In Cambridge and Dublin Mathematical Journal, vol. 2, 1847, pp. 191-204.

Reck, et al., "Experimental Realization of any Discrete Unitary Operator", In Journal of Physical Review Letters, vol. 73, Issue 1, Jul. 4, 1994, pp. 58.

\* cited by examiner

100

---
Algorithm 1 Forward $U$
---
Input:
   Sequence of coordinate pairs $E = (e_1, \ldots, e_N)$
   Parametrizing angles $\theta = (\theta_{e_1}, \ldots, \theta_{e_N})$
Output:
   $U(\theta)$
$U \leftarrow I_n$
for $e \in \text{reversed}(E)$ do
   $(i, j) \leftarrow e$
   $r_i \leftarrow \cos\theta_{ij} U_{i:} - \sin\theta_{ij} U_{j:}$
   $r_j \leftarrow \sin\theta_{ij} U_{i:} + \cos\theta_{ij} U_{j:}$
   $U_{i:} \leftarrow r_i$
   $U_{j:} \leftarrow r_j$
end for
---

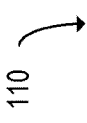

Algorithm 2 Parallel Forward $U$

Input:
 Block sequence $B = (b_1, \ldots, b_{n-1})$ such that $B$ is round-robin
 Parameterizing angles $\boldsymbol{\theta} = (\theta_{e_1}, \ldots, \theta_{e_N})$
Output:
 $U(\boldsymbol{\theta})$
$U \leftarrow I_n$
for $b \in \text{reversed}(B)$ do
 for $e \in b$ do  ▷ This block is fully parallel
  $(i, j) \leftarrow e$
  $r_i \leftarrow \cos\theta_{ij} U_{i,:} - \sin\theta_{ij} U_{j,:}$
  $r_j \leftarrow \sin\theta_{ij} U_{i,:} + \cos\theta_{ij} U_{j,:}$
  $U_{i,:} \leftarrow r_i$
  $U_{j,:} \leftarrow r_j$
 end for
 Synchronize parallel operations
end for Algorithm 3 Parallel JVP

Input:
Block sequence $B = (b_1, \ldots, b_{n-1})$ such that $E$ is round-robin
Parameterizing angles $\boldsymbol{\theta} = (\theta_{e_1}, \ldots, \theta_{e_N})$
$U$ computed by Forward Algorithm 2
Loss gradient with respect to outputs $\boldsymbol{\Gamma}$

Output:
Loss gradient with respect to parameters: $\frac{\partial \mathcal{L}}{\partial \boldsymbol{\theta}}$

Initialize:
$\boldsymbol{U}^{\text{fwd}} \leftarrow \boldsymbol{U}$
$\boldsymbol{M} \leftarrow \boldsymbol{\Gamma}^T$
$A \leftarrow$ empty $N/2 \times N$ matrix
for $b \in \text{reversed}(B)$ do
  for $e \in b$ do                                                               ▷ Parallel $\boldsymbol{U}^{\text{fwd}}$ updates: $O(1)$
    $(i,j) \leftarrow e$
    $c_i \leftarrow \cos\theta_{ij} \boldsymbol{U}_{ij}^{\text{fwd}} - \sin\theta_{ij} \boldsymbol{U}_{ij}^{\text{fwd}}$
    $c_j \leftarrow \sin\theta_{ij} \boldsymbol{U}_{ij}^{\text{fwd}} + \cos\theta_{ij} \boldsymbol{U}_{ij}^{\text{fwd}}$
    $\boldsymbol{U}_i^{\text{fwd}} \leftarrow c_i$
    $\boldsymbol{U}_j^{\text{fwd}} \leftarrow c_j$
  end for
  Synchronize

FROM FIG. 6A

```
for e ∈ b do
    (i, j) ← e
    r₁ ← cos θᵢⱼ Mᵢ: − sin θᵢⱼ Mⱼ:
    r₂ ← sin θᵢⱼ Mᵢ: + cos θᵢⱼ Mⱼ:
    Mᵢ: ← r₁
    Mⱼ: ← r₂
end for
Synchronize                                    ▷ Parallel M update: O(1)
for e ∈ b do
    (i, j) ← e
    m ← m(e)
    for t ∈ {0, ..., n − 1} do                 ▷ Parallel A assignment: O(1)
        A_{m,t} ← M_{i,t} u_j − M_{j,t} u_i    ▷ Parallel
    end for
end for
Synchronize
d ← A1_n                                       ▷ Sum rows of A: O(log n)
for e ∈ b do                                   ▷ Parallel JVP assignment: O(1)
    (i, j) ← e
    m ← m(e)
    ∂f/∂θₘ ← d_m
end for
end for
```

130

---
Algorithm 4 Parallel Forward $U \in U(n)$
---
Input:
  Block sequence $B = (b_1, \ldots, b_{n-1})$ such that $E$ is round-robin
  Parametrizing angles $\boldsymbol{\theta} = (\theta_{e_1}, \ldots, \theta_{e_N})$
  Parametrizing phase angles $\boldsymbol{\phi} = (\phi_{e_1}, \ldots, \phi_{e_N})$
Output:
  $U(\boldsymbol{\theta})$
$U \leftarrow I_n$
for $b \in \text{reversed}(B)$ do
  for $e \in b$ do
    $(i, j) \leftarrow e$
    $r_i \leftarrow e^{i\phi_{ij}} \cos\theta_{ij} U_{i:} - \sin\theta_{ij} U_{j:}$
    $r_j \leftarrow e^{i\phi_{ij}} \sin\theta_{ij} U_{i:} + \cos\theta_{ij} U_{j:}$
    $U_{i:} \leftarrow r_i$
    $U_{j:} \leftarrow r_j$
  end for
  Synchronize parallel operations
end for
---

FIG. 7

BACKPROPAGATION USING PARAMETRIZING ANGLES OF UNITARY MATRIX

BACKGROUND

In some recent work in machine learning, orthogonal matrices have been used to encode the weights of neurons in neural networks. An orthogonal matrix is a square matrix in which the columns of the matrix specify a set of orthogonal vectors. Orthogonal matrices satisfy the property $U^T = U^{-1}$, where $U^T$ is the transpose of the matrix U and $U^{-1}$ is the inverse of the matrix U. In addition, the set of orthogonal matrices is the subset of the set of unitary matrices for which each matrix element is real-valued. The set of unitary matrices is the set of matrices for which $U^\dagger = U^{-1}$, where $U^\dagger$ is the conjugate transpose of the matrix U.

By using an orthogonal matrix to encode the weights of the neurons in a neural network, the vanishing gradient problem and the exploding gradient problem may be avoided when training the neural network via backpropagation. The exploding gradient problem and the vanishing gradient problem, respectively, occur when a gradient of a loss function becomes very large or very small when backpropagation is performed. Thus, the weights of the neural network may be updated by amounts that are too large or too small to achieve the desired behavior of the neural network. Representing the weights in an orthogonal matrix may prevent the exploding and vanishing gradient problems by normalizing the lengths of the column vectors.

SUMMARY

According to one aspect of the present disclosure, a computing system is provided, including a processor configured to train a machine learning model in a plurality of backpropagation iterations. Each backpropagation iteration may include generating a coordinate pair sequence including a plurality of coordinate pairs. Each coordinate pair of the plurality of coordinate pairs may be unique within the coordinate pair sequence and may include non-matching coordinates. The backpropagation iteration may further include receiving a plurality of parametrizing angles respectively associated with the plurality of coordinate pairs. The backpropagation iteration may further include computing a unitary matrix parametrized by the plurality of parametrizing angles. The backpropagation iteration may further include computing a loss gradient matrix of a training loss with respect to a plurality of unitary matrix elements of the unitary matrix. The backpropagation iteration may further include computing a Jacobian-vector product (JVP) of the training loss with respect to the plurality of parametrizing angles. Computing the JVP may include computing a rotated unitary matrix by performing, on the unitary matrix, for each coordinate pair of the plurality of coordinate pairs, an inverse Givens rotation by the parametrizing angle for the coordinate pair around an axis specified by the coordinate pair. Computing the JVP may further include computing a rotated loss gradient matrix by performing, on the loss gradient matrix, for each coordinate pair of the plurality of coordinate pairs, a Givens rotation by the parametrizing angle for the coordinate pair around the axis specified by the coordinate pair. The JVP may be computed from the rotated unitary matrix and the rotated loss gradient matrix. The backpropagation iteration may further include updating the plurality of parametrizing angles based at least in part on the JVP.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows example pseudocode for a first algorithm by which the processor may be configured to compute a unitary matrix based on a plurality of parametrizing angles and a coordinate pair sequence, according to the example of FIG. 1A.

FIG. 3 shows example pseudocode for a second algorithm by which the processor may be configured to compute a unitary matrix based on a plurality of parametrizing angles and a coordinate pair sequence arranged in a plurality of blocks, according to the example of FIG. 1A.

FIGS. 6A-6B show example pseudocode for a third algorithm by which the processor may be configured to compute a Jacobian-vector product (JVP) for the machine learning model, according to the example of FIG. 1A.

FIG. 7 shows example pseudocode for a fourth algorithm by which the processor may be configured to compute a unitary matrix based on a plurality of parametrizing angles, a plurality of parametrizing phase angles, and a coordinate pair sequence arranged in a plurality of blocks, according to the example of FIG. 1A.

DETAILED DESCRIPTION

In previous work on the use of orthogonal matrices in machine learning, methods of training neural networks when weights are represented in orthogonal matrices have been difficult to generalize. Some of the previously existing methods have been limited to specific subsets of the set of unitary matrices. Other existing methods have included steps with high computational complexity, such as an $O(n^3)$ matrix inversion that may make such methods impractical to use for training large models. In addition, existing methods of using orthogonal matrices when training machine learning models have not been amenable to high levels of parallelization.

In order to overcome the above challenges, systems and methods for training machine learning models are discussed below. In the following examples, the matrices used to represent weights are members of the set of special orthogonal matrices $\{U \in SO(n)\}$, which are real-valued matrices that satisfy the properties $UU^T = U^TU = I$ and det $U = 1$, where I is an identity matrix. However, as discussed in further detail below, the following systems and methods may be extended such that any unitary matrices may be used. In addition, the following examples assume that the number of columns n included in the matrix U is even. Extensions of the following techniques to odd values of n are also discussed below.

Figure 1A:
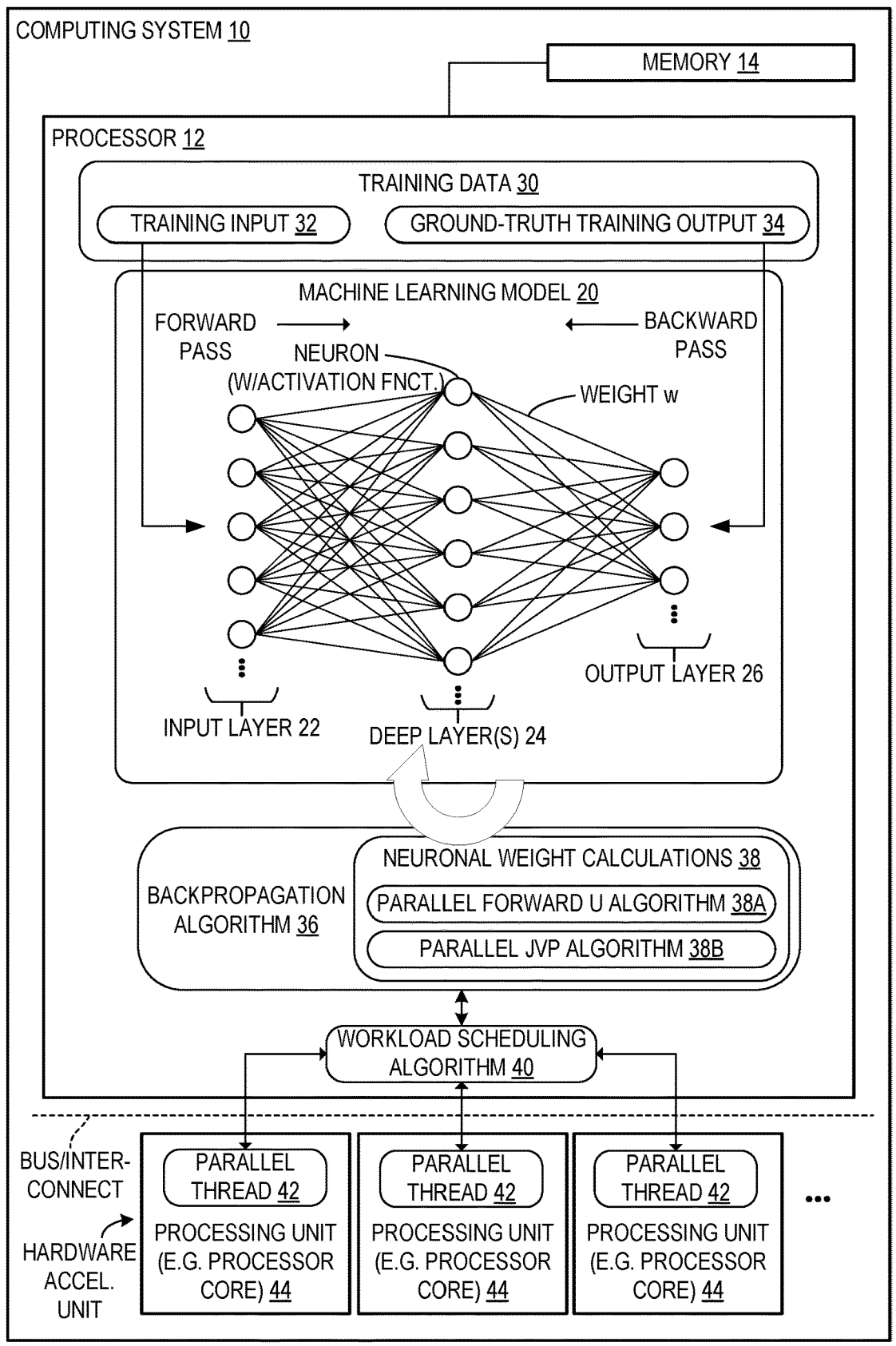
FIG. 1A schematically shows an example computing system including a processor at which a machine learning model may be trained in parallel at a plurality of processor threads, according to one example embodiment.

FIG. 1A schematically shows an example computing system 10 at which a machine learning model 20 may be trained, according to one embodiment of the present disclosure. The computing system 10 may include a processor 12 and memory 14 that are communicatively coupled. In the example of FIG. 1A, the processor 12 and memory 14 are shown within a single physical computing device. However, in other examples, the functionality of the processor 12 and/or the memory 14 may be distributed across a plurality of communicatively coupled physical computing devices. The plurality of physical computing devices may, in such examples, be a plurality of server computing devices located in a data center. The processor 12 may, for example, be instantiated in one or more central processing units (CPUs), graphical processing units (GPUs), field-programmable gate arrays (FPGAs), specialized hardware accelerators, or processing devices of some other type.

The processor 12 may be configured to execute a plurality of processor threads 42 in parallel when training the machine learning model 20. As shown in the example of FIG. 1A, the processor 12 may be configured to execute a workload scheduling algorithm 40 to assign computational tasks to the plurality of processor threads 42. The workload scheduling algorithm 40 may, in such examples, be configured to transmit instructions to a plurality of processing units 44 to execute the plurality of processor threads 42 in parallel. The plurality of processor threads 42 may then be executed at the respective plurality of processing units 44. The plurality of processing units 44 may be instantiated at a single physical computing device or at a plurality of physical computing devices included in the computing system 10. The processing units may be particular cores of a multi-core processor (e.g., multi-core central processing unit (CPU), multi-core graphics processing unit (GPU), or multi-core tensor processing unit (TPU), or may be embodied by single core CPUs, GPUs, or TPUs, or may be field programmable gate array (FPGA) acceleration hardware, as some examples. In the example of FIG. 1A, the plurality of processor threads 42 are depicted as being executed at a plurality of processor cores of a hardware acceleration unit coupled to the processor 12 by an interconnect.

The machine learning model 20 may be a deep neural network, as shown in the example of FIG. 1A. For example, the machine learning model 20 may be a convolutional neural network, a recurrent neural network, or a generative model. The machine learning model 20 may include a plurality of neurons with respective activation functions. In addition, the connections between the neurons may have respective weights w that may form the parameters of the machine learning model 20. The plurality of neurons may be organized into an input layer 22, one or more deep layers 24, and an output layer 26. Each neuron may be connected to at least one other neuron in each adjacent layer. When the machine learning model 20 receives input, that input may be loaded into the input layer 22 and passed through the one or more deep layers 24 such that one or more outputs are produced at the output layer 26.

The machine learning model 20 may be trained using training data 30 including a plurality of training inputs 32 and a corresponding plurality of ground-truth training outputs 34. The processor 12 may be configured to train the machine learning model 20 using a backpropagation algorithm 36. When the processor 12 executes the backpropagation algorithm 36, the processor 12 may be configured to perform a plurality of iterations that each include a forward pass and a backward pass through the machine learning model 20. In each forward pass, the processor 12 may be configured to input one or more training inputs 32 into the input layer 22 and compute one or more outputs. During the backward pass, the processor 12 may be configured to compare the one or more outputs produced during the forward pass to corresponding ground-truth training outputs 34 using a loss function, of which the processor 12 may be configured to compute a gradient. The processor 12 may then be configured to modify the weights of the machine learning model 20 based on the gradient of the loss function. Thus, when the backpropagation algorithm 36 is executed, the processor 12 may be configured to perform a plurality of neuronal weight calculations 38 for the machine learning model 20.

Figure 1B:
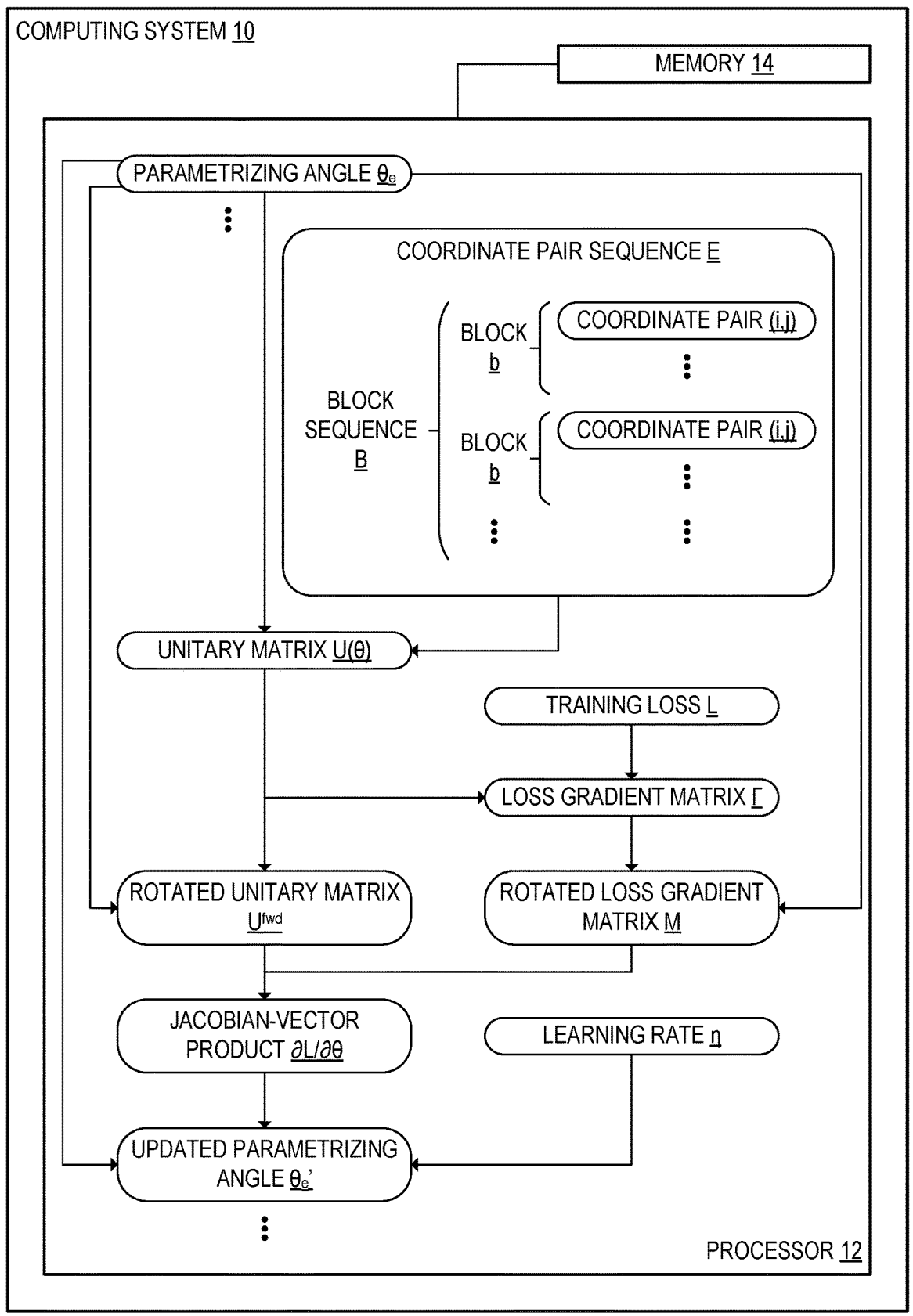
FIG. 1B schematically shows the example computing system of FIG. 1A when a backpropagation iteration is performed at the processor.

Each neuronal weight calculation 38 of the backpropagation algorithm may include performing a parallel forward U algorithm 38A and a parallel Jacobian-vector product (JVP) algorithm 38B. FIG. 1B shows the computing system 10 in additional detail when the parallel forward U algorithm 38A and the parallel JVP algorithm 38B are performed at the processor 12. As discussed above, the processor 12 of the computing system 10 may be configured to train a machine learning model in a plurality of backpropagation iterations that each include a forward pass and a backward pass. In the forward pass, the processor 12 may be configured to compute a unitary matrix U parametrized by a plurality of parametrizing angles θ, as discussed in further detail below. During the backward pass, the processor 12 may be configured to compute a Jacobian-vector product (JVP) defined as $$\frac{\partial L}{\partial \theta} = \left(\frac{\partial U}{\partial \theta}\right)^T \frac{\partial L}{\partial U}$$

where L is a training loss of the machine learning model. In each backpropagation iteration, the processor 12 may be further configured to update the parameters of the machine learning model based at least in part on the JVP. Thus, the processor 12 may be configured to train the machine learning model by updating the model parameters over the course of the plurality of backpropagation iterations.

A unitary matrix U may be parametrized via composition of a plurality of Givens rotations. When the unitary matrix U is parametrized using Givens rotations, $N \triangleq n(n-1)/2$ Givens rotations may be performed in the planes spanned by pairs of coordinate axes of the unitary matrix U. The processor 12 may be configured to define an order in which the Givens rotations are applied to parametrize SO(n). The order in which the Givens rotations are applied may be indicated as a coordinate pair sequence $E=(e_1 \ldots e_N)$ including a plurality of coordinate pairs $e_k=(i, j)$, with i<j. Each coordinate pair $e_k$ of the plurality of coordinate pairs may be unique within the coordinate pair sequence E and may include non-matching coordinates. The coordinates of the unitary matrix U may be labeled with indices in $\{0, \ldots n-1\}$. The elements $e_k$ of the coordinate pair sequence E may be used to define the order in which the Givens rotations are applied, as discussed in further detail below.

Each backpropagation iteration may include receiving a plurality of parametrizing angles $\theta_e$ respectively associated with the plurality of coordinate pairs $e_k$. Thus, the processor 12 may be configured to receive N parametrizing angles $\theta_e$, which may be indicated collectively as $\theta=(\theta_1, \ldots \theta_N)$. The plurality of parametrizing angles $\theta_e$ may be used as a basis in which the weights of the neurons included in the machine learning model are parametrized. The plurality of parametrizing angles $\theta_e$ may each parametrize a rotation in a corresponding plane spanned by unit vectors for the i and j coordinates. Each parametrizing angle $\theta_e$ may be the angle by which a corresponding Givens rotation is performed, as discussed in further detail below.

Each Givens matrix of the plurality of Givens matrices may differ from an identity matrix by only four elements. For the coordinate pair e=(i, j), the elements of the corresponding Givens matrix that may differ from those of the identity matrix are (i, i), (i, j), (j, i), and (j, j). The nonzero elements of the Givens matrix $G^e(\theta_e)$ may be defined as follows:

$G_{ii}^e = G_{jj}^e = \cos \theta_{ij}$ $G_{ij}^e = -\sin \theta_{ij}$ $G_{ji}^e = \sin \theta_{ij}$ $G_{ll}^e = 1$ for $l \neq i, l \neq j$.

Thus, multiplication by $G^e(\theta_e)$ may only modify rows i and j of the multiplicand. The unitary matrix U may be parametrized as follows using the plurality of Givens matrices:

$$U = \prod_{e \in E} G^e(\theta_e)$$

In the above parametrization, the angles $\theta=(\theta_{e_1}, \ldots, \theta_{e_N}) \in \mathbb{R}^N$ associated with the coordinate pairs e may be the parameters that trace the set of matrices in SO(n).

Real-valued orthogonal matrices with dimension n, forming what is known as the orthogonal group, may belong to either SO(n) or to a set of real-valued orthogonal matrices with determinant −1, also known as reflections. Reflections may be parametrized using Givens matrices similarly to matrices in SO(n), with an additional step of negating an arbitrary fixed column following construction of the matrix from Givens rotations.

FIG. 2 shows pseudocode of an example first algorithm 100 via which the processor 12 may be configured to compute the unitary matrix $U(\theta)$ based on the plurality of parametrizing angles $\theta$. In the first algorithm 100 of FIG. 2, the unitary matrix U is initialized as an n×n identity matrix $I_n$. The processor 12 may be further configured to compute the unitary matrix U at least in part by iteratively performing a plurality of Givens rotations by the parametrizing angles $\theta$ on the identity matrix $I_n$. In the example first algorithm 100 of FIG. 2, the plurality of Givens rotations by the angles $\theta_{ij}$ associated with the coordinate pairs e=(i, j) are iteratively performed on the identity matrix $I_n$ in a reverse order from the order in which the coordinate pairs occur in E. After all N Givens rotations have been performed, the first algorithm 100 returns the resulting matrix as $U(\theta)$.

In the example of FIG. 2, each Givens rotation may be performed in O(n) sequential operations, which may be parallelized. However, the first algorithm 100 includes $N=O(n^2)$ Givens rotations. Since these Givens rotations do not typically commute, the $N=O(n^2)$ Givens rotations are also not parallelizable. In order to address these shortcomings of the first algorithm 100, pseudocode of a second algorithm 110 is shown in the example of FIG. 3. The second algorithm 110 is one example of the parallel forward U algorithm 38A shown in FIG. 1A. In the second algorithm 110 of FIG. 3, the coordinate pairs are arranged into a block sequence $B=(b_1, \ldots b_{n-1})$. Within each block b, each index included in $\{0, \ldots n-1\}$ may occur once. Thus, the block sequence may define a plurality of Givens rotation blocks b that each include a plurality of mutually commutative Givens rotations. Since the Givens rotations included in each block b commute with each other, those Givens rotations may be computed in parallel.

Figure 4:
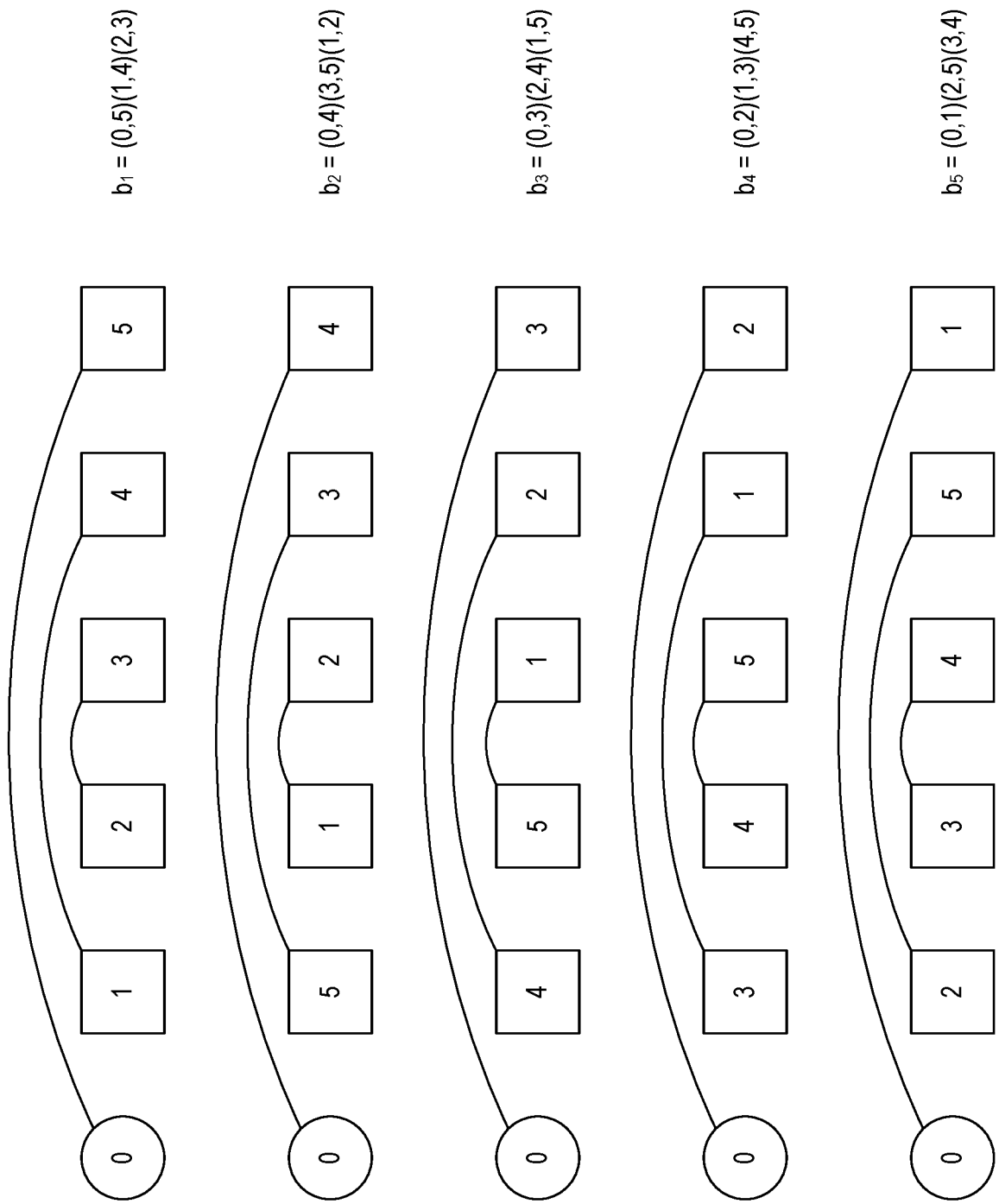
FIG. 4 schematically shows the generation of an example block sequence including a plurality of blocks of coordinate pairs, according to the example of FIG. 1A.

The processor 12 may be configured to compute block sequence B using a round-robin scheduling algorithm known as the circle method. The circle method may be performed for an index sequence of n indices and may include n−1 pairing iterations. An example of the circle method when n=6 is shown in FIG. 4. In each pairing iteration of the plurality of pairing iterations, the processor 12 may be configured to hold one index fixed while shifting the positions of the other indices by one, in a loop that connects the ends of the index sequence without including the fixed index. Thus, in each pairing iteration subsequent to an initial pairing iteration, the pairing iteration may include shifting a respective position in the index sequence of each index other than the fixed index by 1 modulo n−1. In the example of FIG. 4, the fixed index is 0. Each pairing iteration may further include iteratively pairing a first unpaired index in the index sequence with a last unpaired index in the index sequence until the index sequence includes fewer than two unpaired indices.

Subsequently to pairing the indices, the pairing iteration may further include adding each pair of indices to the coordinate pair sequence E. The pairs added to the coordinate pair sequence E in the pairing iteration may collectively form a block b. Thus, within the coordinate pair sequence E, the coordinate pairs e may be grouped into a plurality of blocks b that form the block sequence B. The block sequence B in the example of FIG. 4 includes the blocks $b_1$, $b_2$, $b_3$, $b_4$, and $b_5$.

In examples in which n is even, the circle method may leave no unpaired indices in each of the pairing iterations. Thus, each index included in the index sequence may be included in each block b. However, in examples in which n is odd, an index may be left unpaired in each pairing iteration. The index left unpaired may be different for each pairing iteration of the plurality of pairing iterations.

In some examples, when the processor 12 computes the block sequence B, the processor 12 may be configured to independently and lazily evaluate a current block at each of a plurality of processor threads. When a block is lazily executed, the processor 12 computes the coordinate pairs included in the block when an instruction to perform a computation using the block is executed, rather than computing the plurality of blocks in advance. The processor 12 may be configured to determine the current block b based at least in part on an iteration number of the current pairing iteration. Accordingly, the plurality of processor threads may compute individual blocks b of the block sequence B without computing the entire block sequence B.

Returning to the example second algorithm 110 of FIG. 3, the processor 12 may be further configured to initialize an intermediate unitary matrix as an identity matrix $I_n$. Iteratively, for each block b of mutually commutative Givens rotations, the processor 12 may be configured to perform the plurality of mutually commutative Givens rotations in parallel on a plurality of copies of the intermediate unitary matrix. The plurality of mutually commutative Givens rotations may, for example, be performed in parallel at a plurality of processor threads, a GPU, an FPGA, or a specialized hardware accelerator. The processor 12 may be further configured to synchronize the plurality of copies of the intermediate unitary matrix after the mutually commutative Givens rotations have been performed on the copies of the intermediate unitary matrix. In some examples, as shown in FIG. 3, the corresponding Givens rotations for the plurality of blocks b may be computed in a reverse order from the order in which the blocks b occur in the block sequence B.

Figure 5:
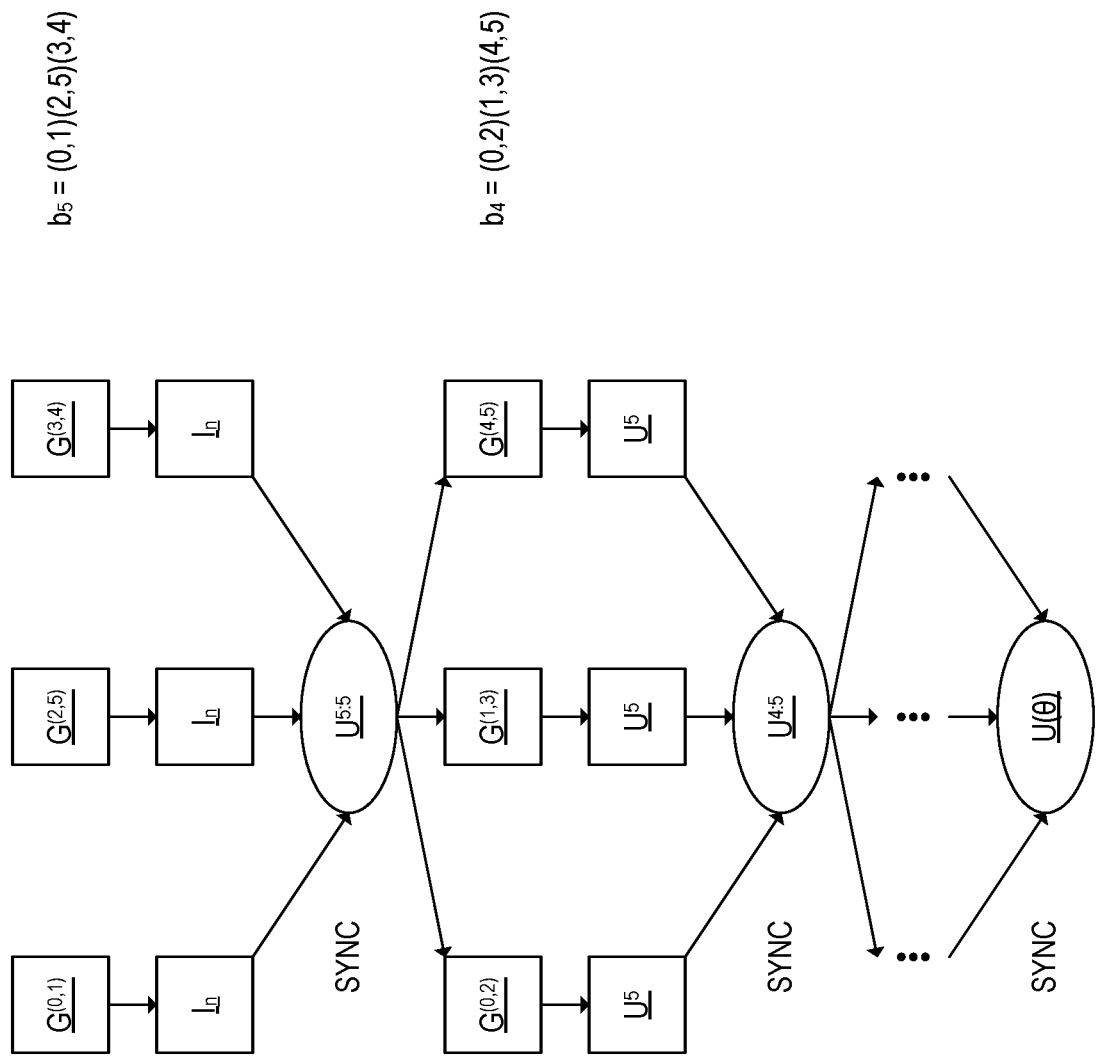
FIG. 5 schematically shows an example computation of the unitary matrix using the second algorithm of FIG. 3 when a plurality of Givens rotations are performed in parallel within the plurality of blocks generated in the example of FIG. 4.

FIG. 5 shows example Givens rotations that may be performed in parallel as indicated by the Givens rotation blocks $b_5$ and $b_4$ of the example of FIG. 4. The Givens rotations may be performed in parallel according to the second algorithm 110 of FIG. 3. In the example of FIG. 5, the intermediate unitary matrix is indicated as $U^{k:n-1}$, where $b_k$ is the most recent block for which Givens rotations were performed on the intermediate unitary matrix. As shown in the example of FIG. 5, the processor 12 may be configured to perform the Givens rotations $G^{(0,1)}$, $G^{(2,5)}$ and $G^{(3,4)}$ on respective copies of the identity matrix $I_n$ at an iteration corresponding to the Givens rotation block $b_5$. The processor 12 may be further configured to synchronize the plurality of copies of the identity matrix $I_n$ after the Givens rotations have been performed. The processor 12 may be configured to thereby generate $U^{5:5}$. When the processor synchronizes the rotated identity matrices, the processor 12 may be configured to multiply the rotated identity matrices together. Since the rotated identity matrices commute with each other, the rotated identity matrices may be multiplied in any order.

At the Givens rotation block $b_4$, the processor 12 may be further configured to perform the Givens rotations $G^{(0,2)}$, $G^{(1,3)}$, and $G^{(4,5)}$ on respective copies of $U^{5:5}$. Thus, the Givens rotations included in the plurality of blocks b may be applied iteratively. The processor 12 may be further configured to synchronize the plurality of copies of $U^{5:5}$ after the Givens rotations have been performed in order to generate $U^{4:5}$. Although not shown in FIG. 5, the processor 12 may be further configured to perform the Givens rotations included in the blocks $b_3$, $b_2$, and $b_1$ on the intermediate unitary matrix and to synchronize the copies of the intermediate unitary matrix after applying the Givens rotations included in each of the above blocks. After the plurality of Givens rotations included in each block of the block sequence B have been applied to the intermediate unitary matrix, the resulting intermediate unitary matrix may be used as the unitary matrix U(0).

Using the second algorithm 110 shown in FIG. 3, the processor 12 may be configured to compute the unitary matrix U(0) with a computational complexity of O(n). In contrast, the first algorithm 100 shown in FIG. 2 may have a computational complexity of $O(n^2)$. Thus, using the second algorithm 110 may allow for significant speedups when computing the unitary matrix U(0) for large values of n.

Returning to FIG. 1B, the processor 12 may be further configured to compute a loss gradient matrix F of a training loss L with respect to a plurality of unitary matrix elements of the unitary matrix U(0). The processor 12 may be configured to compute the training loss L by computing the value of a loss function, which may be a classification loss function or a regression loss function. The loss gradient matrix F may be an n×n matrix defined as:

$$\Gamma \triangleq \frac{\partial L}{\partial \theta}$$

In some examples, the processor 12 may be configured to compute the loss gradient matrix F via automatic differentiation of the training loss L with respect to the unitary matrix elements of the unitary matrix U(0). The processor 12 may, for example, be configured to perform automatic differentiation by executing a function included in a machine learning library.

The processor 12 may be further configured to compute the JVP of the training loss L with respect to the plurality of parametrizing angles θ. The processor 12 may be configured to compute the JVP directly rather than computing the two partial derivatives on the righthand side of the equation defining the JVP as discussed above. When the processor 12 computes the JVP, the processor 12 may be configured to compute a rotated unitary matrix $U^{fwd}$ and a rotated loss gradient matrix M, as discussed in further detail below. The processor 12 may be further configured to compute the JVP from the rotated unitary matrix $U^{fwd}$ and the rotated loss gradient matrix M.

FIGS. 6A-6B show pseudocode of a third algorithm 120. The third algorithm 120 of FIGS. 6A-6B is one example of the parallel JVP algorithm 38A of FIG. 1A by which the processor 12 may be configured to compute the JVP. A first portion 120A of the third algorithm 120 is shown in FIG. 6A. As shown in FIG. 6A, the inputs of the third algorithm 120 may be the block sequence B=($b_1$, ... $b_{n-1}$), the parametrizing angles θ=($\theta_{e_1}$, ..., $\theta_{e_N}$), the unitary matrix U, and the loss gradient matrix F.

In the first portion 120A of the third algorithm 120 shown in FIG. 6A, the processor 12 may be configured to compute the rotated unitary matrix $U^{fwd}$. The processor 12 may be configured to compute the rotated unitary matrix $U^{fwd}$ at least in part by initializing an intermediate rotated unitary matrix as the unitary matrix U. Computing the rotated unitary matrix $U^{fwd}$ may further include performing, on the unitary matrix U, for each coordinate pair e=(i, j) of the plurality of coordinate pairs e, an inverse Givens rotation by the parametrizing angle $\theta_e$ for the coordinate pair e around an axis specified by the coordinate pair e. The axis specified by the coordinate pair may be an axis perpendicular to a plane spanned by the i and j unit vectors, as discussed above. An inverse Givens rotation by an angle $\theta$ is defined herein as a Givens rotation by the angle $-\theta$. The inverse Givens rotations may be performed iteratively, for each of a plurality of inverse Givens rotation blocks that each include a plurality of mutually commutative inverse Givens rotations. As shown in the example of FIG. 6A, the inverse Givens rotation blocks may be the Givens rotation blocks b as defined above.

Within each inverse Givens rotation block, the processor 12 may be configured to perform the mutually commutative inverse Givens rotations in parallel on a plurality of copies of the intermediate rotated unitary matrix. The processor 12 may be further configured to synchronize the plurality of copies of the intermediate rotated unitary matrix after the mutually commutative inverse Givens rotations have been performed on the copies of the intermediate rotated unitary matrix. Thus, within each inverse Givens rotation block, the plurality of inverse Givens rotations may be performed in parallel and the results of the parallel computations may be synchronized to update the intermediate rotated unitary matrix. The blocks of inverse Givens rotations may be applied to the intermediate rotated unitary matrix in reverse block sequence order. After the inverse Givens rotations have been performed for each inverse Givens rotation block, the resulting intermediate rotated unitary matrix may be used as the rotated unitary matrix $U^{fwd}$.

FIG. 6B shows pseudocode for a second portion 120B of the third algorithm 120 as a continuation of the first portion 120A shown in FIG. 6A. FIG. 6B shows pseudocode for the computation of the rotated loss gradient matrix M. When the processor 12 computes the rotated loss gradient matrix M, the processor 12 may be configured to initialize an intermediate rotated loss gradient matrix as the loss gradient matrix F. The processor 12 may be further configured to perform, on the loss gradient matrix F, for each coordinate pair e=(i, j) of the plurality of coordinate pairs e, a Givens rotation by the parametrizing angle $\theta_e$ for the coordinate pair e around the axis specified by the coordinate pair e. The processor 12 may be configured to iteratively perform the plurality of Givens rotations in a plurality of Givens rotation blocks that each include a plurality of mutually commutative Givens rotations. The plurality of Givens rotation blocks may be the blocks b discussed above, which may be applied to the intermediate rotated loss gradient matrix in reverse block sequence order.

In each Givens rotation block b, the processor 12 may be configured to perform the mutually commutative Givens rotations included in the block b in parallel on a plurality of copies of the intermediate rotated loss gradient matrix. The processor 12 may be further configured to synchronize the plurality of copies of the intermediate rotated loss gradient matrix after the mutually commutative Givens rotations have been performed on the copies of the intermediate rotated loss gradient matrix. After the plurality of Givens rotations have been performed for each Givens rotation block b, the resulting intermediate rotated loss gradient matrix may be used as the rotated loss gradient matrix M.

When the processor 12 computes the JVP from the rotated unitary matrix $U^{fwd}$ and the rotated loss gradient matrix M, the processor 12 may be configured to compute an intermediate vector product matrix A from the rotated unitary matrix $U^{fwd}$ and the rotated loss gradient matrix M. The intermediate vector product matrix A may be an N/2×N matrix and may be initialized as an empty matrix when the third algorithm 120 is performed. The processor 12 may be configured to compute the intermediate vector product matrix A at least in part by generating a mapping of the coordinate pairs e to rows m(e) of the intermediate vector product matrix A. The processor 12 may be configured to compute N elements of the intermediate vector matrix A for each coordinate pair e. For each row of the intermediate vector product matrix A, the processor 12 may be further configured to compute each intermediate vector product matrix element included in that row as follows:

$$A_{ml} \leftarrow M_{il} u_{li} - M_{jl} u_{li}$$

where M is the rotated loss gradient matrix, u is the rotated unitary matrix, i and j are the coordinates included in the coordinate pair, and l is a column number of the intermediate vector product matrix A.

Subsequently to computing the elements of the intermediate vector product matrix A, the processor 12 may be further configured to compute, as elements of the JVP, a plurality of sums of rows of the intermediate vector product matrix A. The processor 12 may be configured to compute the sums of the rows of the intermediate vector product matrix A by multiplying A by a vector of ones:

$$d \leftarrow A 1_n$$

The processor 12 may be further configured to set the elements of the JVP to corresponding elements of d as specified by the mapping between the rows of A and the coordinate pairs e:

$$\frac{\partial L}{\partial \theta_e} \leftarrow d_{m(e)}$$

Thus, the processor 12 may be configured to compute the corresponding element of the JVP for each parametrizing angle $\theta_e$.

Using the third algorithm 120 shown in FIGS. 6A-6B, the processor 12 may be configured to compute the JVP with O(n log n) complexity. The summation of the rows of the intermediate vector product matrix A may be performed in O(log n) time, and each of the other steps performed for a block b in the third algorithm 120 may be performed in O(1) time. Since the number of blocks b in the block sequence B is n−1 when the circle method is used to compute the block sequence B, the overall computational complexity of computing the JVP using the third algorithm 120 may be O(n log n).

Returning to FIG. 1B, subsequently to computing the JVP, the processor 12 may be further configured to update the plurality of parametrizing angles $\theta_e$ based at least in part on the JVP. Thus, the processor 12 may be configured to compute a plurality of updated parametrizing angles $\theta_e'$. The processor 12 may be configured to compute the plurality of updated parametrizing angles $\theta_e'$ via gradient descent, which may be further based at least in part on a learning rate $\eta$. The plurality of updated parametrizing angles $\theta_e'$ may be computed for each backpropagation iteration executed at the processor 12 when training the machine learning model. In some examples, the processor 12 may be configured to dynamically modify the learning rate η between backpropagation iterations.

Although, in the above examples, U(θ) is a real-valued orthogonal matrix, the techniques discussed above may be extended to unitary matrices that include imaginary- or complex-valued elements, as shown in the example fourth algorithm 130 of FIG. 7. The example fourth algorithm 130 shown in FIG. 7 is an algorithm by which the unitary matrix U may be computed when the elements of the unitary matrix U are not assumed to be real-valued. As shown in the example of FIG. 7, the processor 12 may be configured to receive a plurality of parametrizing phase angles φ=(φ$_{e_1}$, . . . φ$_{e_N}$) in addition to the block sequence B and the plurality of parametrizing angles θ. Each parametrizing phase angle φ$_e$ may contribute a respective complex phase factor $e^{\iota\varphi_e}$ to the corresponding Givens rotation for that coordinate pair e. Thus, the elements of the Givens rotation $G^e(\theta_e, \varphi_e)$ matrix may be as follows:

$$G_{ii}^e = G_{jj}^e = e^{\iota\varphi_{ij}} \cos\theta_{ij}$$

$$G_{ij}^e = -\sin\theta_{ij}$$

$$G_{ji}^e = e^{\iota\varphi_{ij}} \sin\theta_{ij}$$

$$G_{ll}^e = 1 \text{ for } l \neq i, l \neq j.$$

In the fourth algorithm 130 shown in FIG. 7, the processor 12 may be further configured to initialize an intermediate unitary matrix as an n×n identity matrix $I_n$. The processor 12 may be further configured to iteratively perform the plurality of Givens rotations $G^e(\theta_e, \varphi_e)$ on the intermediate unitary matrix in a plurality of Givens rotation blocks b that each include a plurality of mutually commutative Givens rotations, as in the second algorithm 110 of FIG. 3. Within each Givens rotation block b, the plurality of Givens rotations may be performed in parallel on a respective plurality of copies of the intermediate unitary matrix. The processor 12 may be further configured to synchronize the plurality of copies of the intermediate unitary matrix after the plurality of Givens rotations in the block have been performed on the copies of the intermediate unitary matrix.

Backpropagation is now discussed for examples in which the elements of U(θ) are not assumed to be real-valued. A forward matrix $U^{fwd}$ and a backward matrix $U^{bck}$ may be defined as the following running matrix products:

$$U^{fwd} = U^{1:k-1} \triangleq \prod_{b \in b_1, \ldots, b_{k-1}} G^b$$

$$U^{bck} = U^{k:n-1} \triangleq \prod_{b \in b_k, \ldots, b_{n-1}} G^b$$

The rows and columns of the forward matrix $U^{fwd}$ and the backward matrix $U^{bck}$ may be expressed as follows:

$$U^{fwd} = [u_1 \ \cdots \ u_n]$$

$$U^{bck} = \begin{bmatrix} v_1^\dagger \\ \vdots \\ v_n^\dagger \end{bmatrix}$$

The processor 12 may be configured to compute a gradient of the unitary matrix U with respect to the parametrizing angles θ and a gradient of the unitary matrix U with respect to the parametrizing phase angles φ:

$$\frac{\partial U}{\partial \theta_e} = u_j v_i^\dagger - u_i v_j^\dagger$$

$$\frac{\partial U}{\partial \varphi_e} = \iota\cos\theta_e(\cos\theta_e u_i + \sin\theta_e u_j)v_i^\dagger + \iota\sin\theta_e(\cos\theta_e u_i + \sin\theta_e u_j)v_j^\dagger =$$

$$\iota(\cos\theta_e u_i + \sin\theta_e u_j)(\cos\theta_e v_i + \sin\theta_e v_j)^\dagger$$

The processor 12 may be further configured to compute gradients of the training loss L relative to the parametrizing angles θ and the parametrizing phase angles φ by applying the chain rule:

$$\frac{\partial L}{\partial \theta} = \left(\frac{\partial U}{\partial \theta}\right)^T \frac{\partial L}{\partial U}$$

$$\frac{\partial L}{\partial \varphi} = \left(\frac{\partial U}{\partial \varphi}\right)^T \frac{\partial L}{\partial U}$$

In this example, the gradient of the training loss L with respect to the unitary matrix elements of the unitary matrix U may be computed as discussed above. Thus, the processor 12 may be configured to compute a JVP with respect to the parametrizing angles θ and a JVP with respect to the parametrizing phase angles cp.

In another extension of the techniques discussed above, a subset of coordinates may be specified such that during each backpropagation iteration, no rotations are performed in planes indicated by coordinate pairs in which both coordinates are included in the subset. Without loss of generality, for an integer m≤n−1, the following quantities may be defined:

$$S \triangleq (0, \ldots, m-1)$$

$$\bar{S} \triangleq (m, \ldots, n-1)$$

$$K \triangleq n-m$$

With the above definitions, the number of excluded coordinate pairs may be equal to κ(κ−1)/2, and the number of remaining coordinate pairs may be equal to mn−m(m+1)/2. For example, when n=8 and m=4, the pairs {(4,5), (4,6), (4,7), (5,6), (5,7), (6,7)} may be excluded from the full set of 28 pairs, leaving 22 remaining pairs. Exclusion of pairs of a subset of coordinates, as discussed above, may be used to parametrize arbitrary m×n matrices.

In examples in which pairs of a subset of coordinates are excluded, the processor 12 may be configured to partition the remaining coordinate pairs into a block sequence of a plurality of blocks. Partitioning the remaining coordinate pairs may be equivalent to solving an edge-coloring problem for a graph in which the first m nodes are adjacent to all other nodes and in which the last K nodes are not connected to each other. In order to adapt the second algorithm 110 of FIG. 3 to be used in examples in which pairs K coordinates are excluded, the inner "for" loop may be augmented with a condition instructing the processor 12 to skip performing the Givens rotation for a coordinate pair when i≥m. Since, by convention, i<j, such a condition would be met when (i, j) is an excluded pair. Similarly to the inner "for" loop of the second algorithm 110, conditions to skip performing the Givens rotations for coordinate pairs where i≥m may also be added to the parallel "for" loops included in the third algorithm 120 and the fourth algorithm 130 in examples in which pairs of a subset of the coordinates are excluded. Skipping Givens rotations in this manner may leave the arithmetic instruction count of sequential portions of the second algorithm 110, third algorithm 120, and fourth algorithm 130 unchanged. In addition, in examples in which m scales linearly with n such that m=an for a fixed value of $\alpha \in (0,1]$, the total number of coordinate pairs N may remain $O(n^2)$. Thus, parallelizing the Givens rotations within blocks may still result in the speedups discussed above in examples in which coordinate pairs are excluded.

Figure 8A:
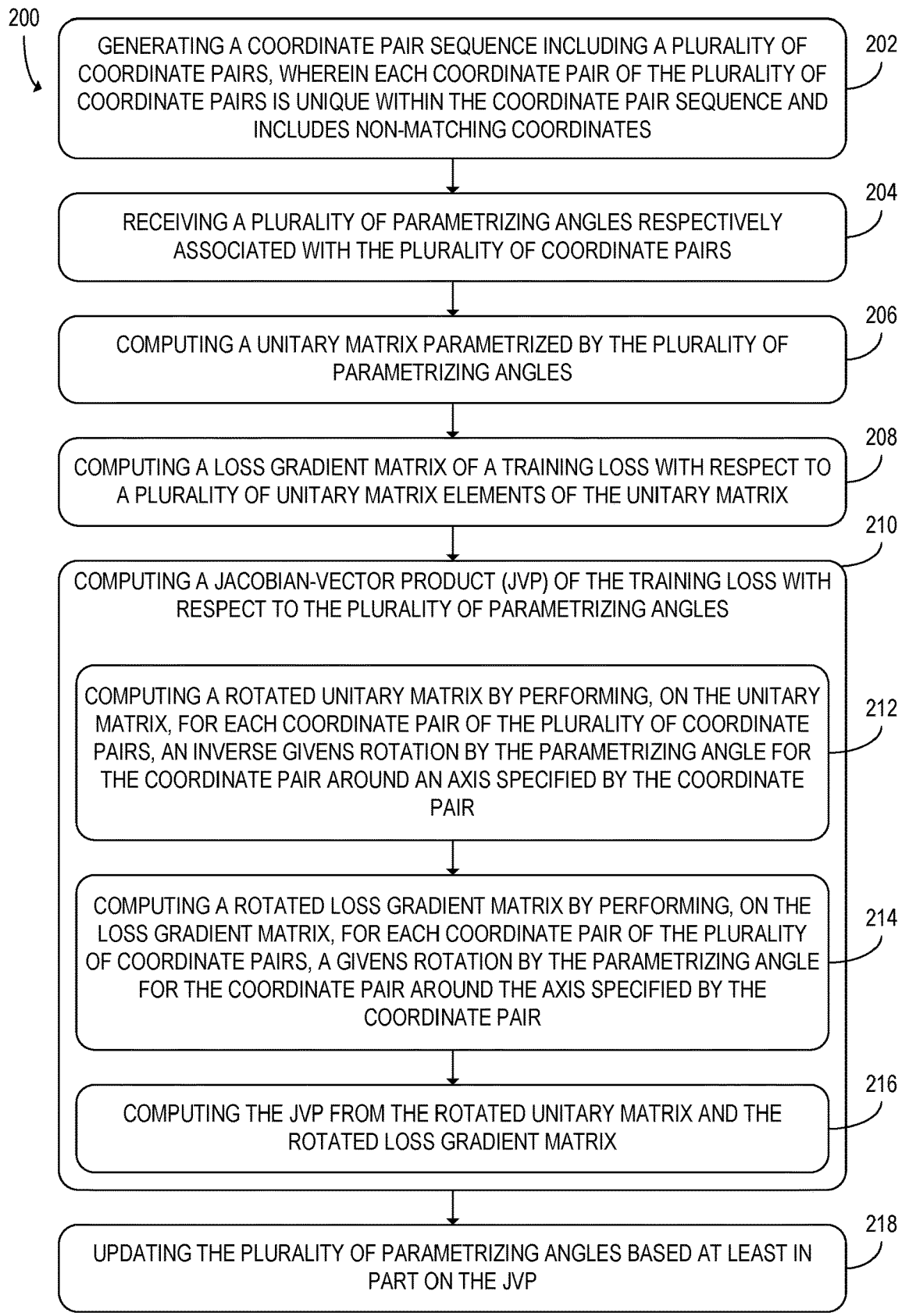
FIG. 8A shows an example method for use with a computing system to train a machine learning model in a plurality of backpropagation iterations, according to the example of FIG. 1A.

FIG. 8A shows a flowchart of a method 200 of training a machine learning model at a computing system. The method 200 may, for example, be performed at the computing system 10 depicted in FIG. 1A. The steps of the method 200 may be performed in each of a plurality of backpropagation iterations that may be performed to determine the weights of neurons included in the machine learning model.

At step 202, the method 200 may include generating a coordinate pair sequence including a plurality of coordinate pairs. Each coordinate pair of the plurality of coordinate pairs may be unique within the coordinate pair sequence and may include non-matching coordinates. At step 204, the method 200 may further include receiving a plurality of parametrizing angles respectively associated with the plurality of coordinate pairs. The parametrizing angle for a coordinate pair may parametrize a rotation in a plane defined by unit vectors corresponding to the coordinates of the coordinate pair.

At step 206, the method 200 may further include computing a unitary matrix parametrized by the plurality of parametrizing angles. The unitary matrix may be computed at least in part by iteratively performing a plurality of Givens rotations by the parametrizing angles on an identity matrix. At step 208, the method 200 may further include computing a loss gradient matrix of a training loss with respect to a plurality of unitary matrix elements of the unitary matrix. The loss gradient matrix may be computed for a predefined loss function of the machine learning model. In some examples, the loss gradient matrix may be computed via automatic differentiation of the training loss with respect to the unitary matrix elements of the unitary matrix.

At step 210, the method 200 may further include computing a JVP of the training loss with respect to the plurality of parametrizing angles. At step 212, computing the JVP at step 210 may include computing a rotated unitary matrix by performing, on the unitary matrix, for each coordinate pair of the plurality of coordinate pairs, an inverse Givens rotation by the parametrizing angle for the coordinate pair. The inverse Givens rotation for a coordinate pair may be performed around an axis specified by the coordinate pair. At step 214, computing the JVP at step 210 may further include computing a rotated loss gradient matrix by performing, on the loss gradient matrix, for each coordinate pair of the plurality of coordinate pairs, a Givens rotation by the parametrizing angle for the coordinate pair. The Givens rotation for a coordinate pair may be performed around the axis specified by the coordinate pair. At step 216, computing the JVP at step 210 may further include computing the JVP from the rotated unitary matrix and the rotated loss gradient matrix.

The method 200 may further include, at step 218, updating the plurality of parametrizing angles based at least in part on the JVP. The plurality of parametrizing angles may be updated via gradient descent, which may be performed based at least in part on a learning rate as well as on the JVP. Thus, each backpropagation iteration may be performed to update the parametrizing angles that parametrize the weights of the neurons included in the machine learning model.

Figure 8B:
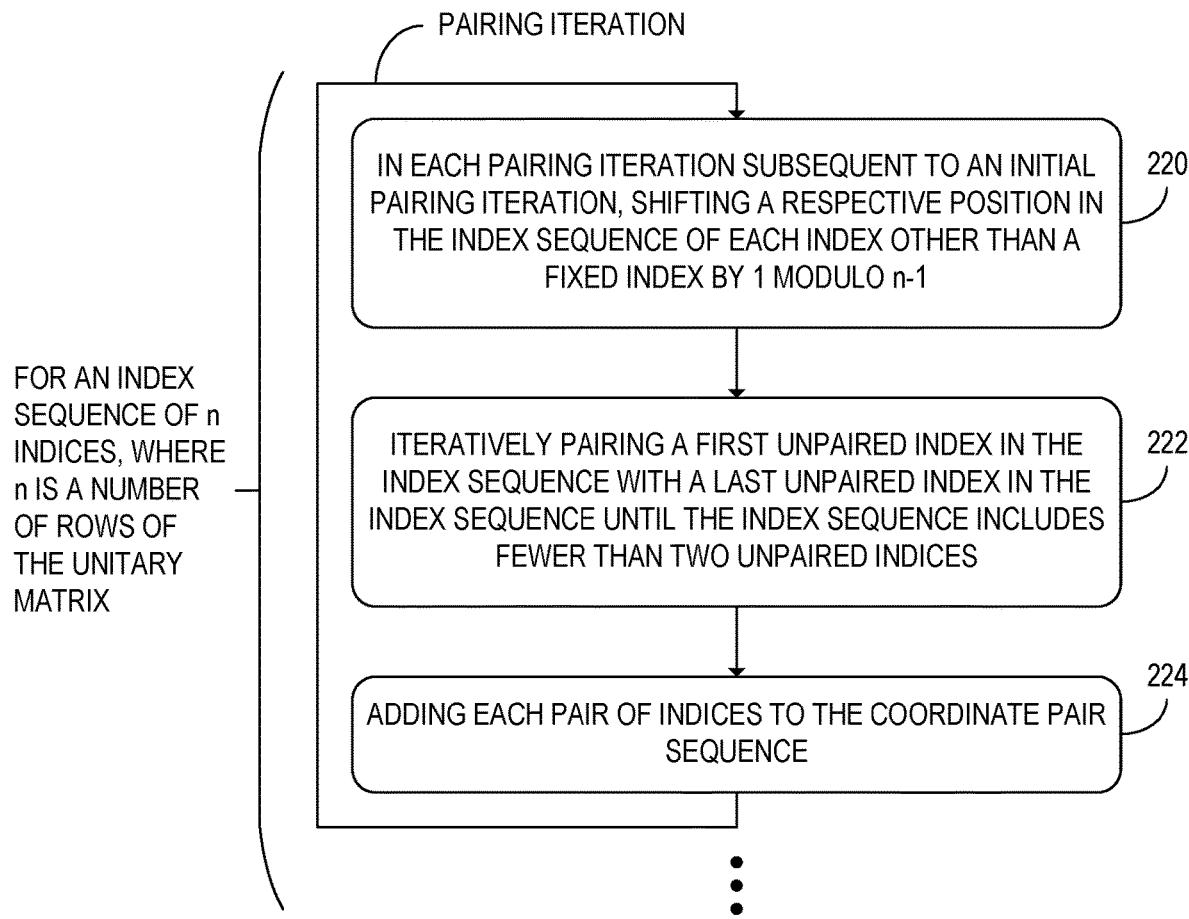
FIG. 8B shows additional steps of the method of FIG. 8A that may be performed when generating a coordinate pair sequence.

FIG. 8B shows additional steps of the method 200 that may be performed in some examples when generating the coordinate pair sequence at step 202. The steps shown in FIG. 8B may be performed for an index sequence of n indices, where n is a number of rows of the unitary matrix. In addition, the steps of FIG. 8B may be performed in each of a plurality of pairing iterations. At step 220, the method 200 may further include, in each pairing iteration subsequent to an initial pairing iteration, shifting a respective position in the index sequence of each index other than a fixed index by 1 modulo n−1. At step 222, the method 200 may further include iteratively pairing a first unpaired index in the index sequence with a last unpaired index in the index sequence until the index sequence includes fewer than two unpaired indices. At step 224, the method 200 may further include adding each pair of indices to the coordinate pair sequence. Thus, in each pairing iteration of the plurality of pairing iterations, a block of coordinate pairs corresponding to mutually commutative Givens rotations may be generated. The order of the blocks in the coordinate pair sequence may indicate a block sequence.

Figure 8C:
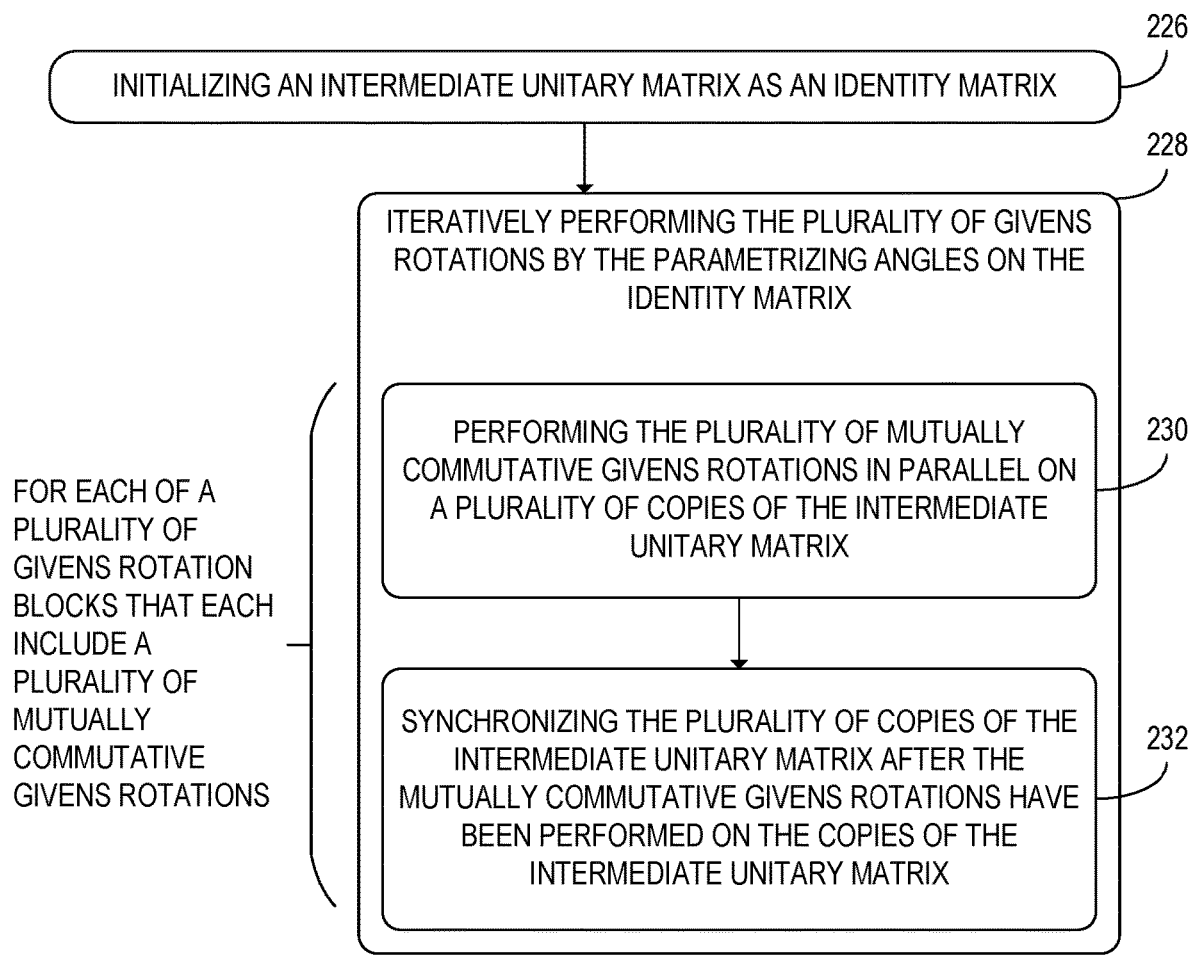
FIG. 8C shows additional steps of the method of FIG. 8A that may be performed when computing a unitary matrix.

FIG. 8C shows additional steps of the method 200 that may be performed in some examples when computing the unitary matrix at step 206. At step 226, the method 200 may include initializing an intermediate unitary matrix as an identity matrix. The identity matrix may be of size n×n. At step 228, the method 200 may further include iteratively performing the plurality of Givens rotations by the parametrizing angles on the identity matrix. Step 228 may include, at step 230, performing the plurality of mutually commutative Givens rotations in parallel on a plurality of copies of the intermediate unitary matrix. Step 228 may further include, at step 232, synchronizing the plurality of copies of the intermediate unitary matrix after the mutually commutative Givens rotations have been performed on the copies of the intermediate unitary matrix. Step 230 and step 232 may be performed for each of a plurality of Givens rotation blocks that each include a plurality of mutually commutative Givens rotations. After step 230 and step 232 have been performed for each Givens rotation block, the resulting intermediate unitary matrix may be used as the unitary matrix.

Figure 8D:
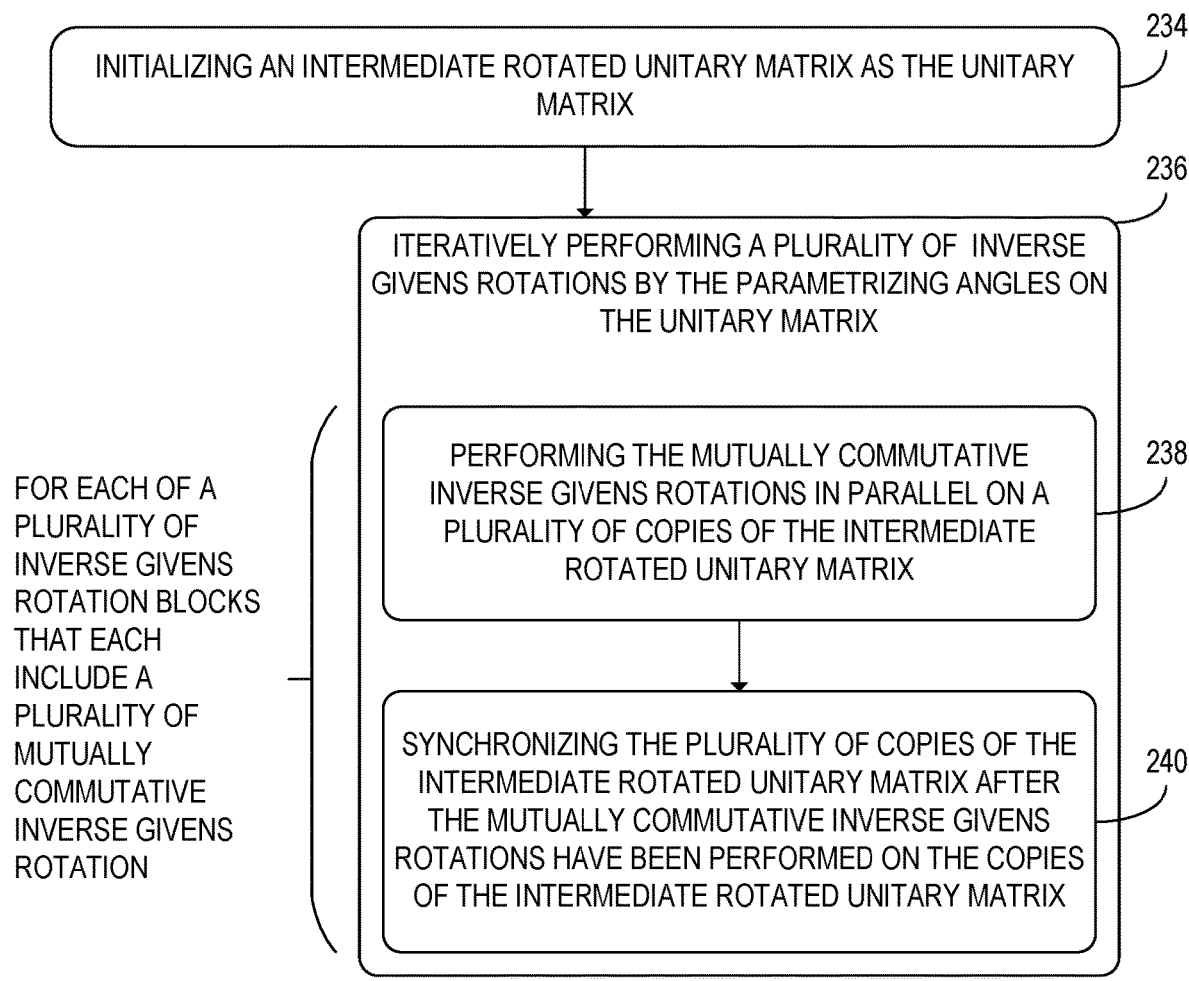
FIG. 8D shows additional steps of the method of FIG. 8A that may be performed when computing a rotated unitary matrix.

FIG. 8D shows additional steps of the method 200 that may be performed in some examples when computing the rotated unitary matrix at step 212. At step 234, the method 200 may further include initializing an intermediate rotated unitary matrix as the unitary matrix. At step 236, the method 200 may further include iteratively performing a plurality of inverse Givens rotations by the plurality of parametrizing angles on the unitary matrix. Step 236 may include, at step 238, performing the mutually commutative inverse Givens rotations in parallel on a plurality of copies of the intermediate rotated unitary matrix. Step 236 may further include, at step 240, synchronizing the plurality of copies of the intermediate rotated unitary matrix after the mutually commutative inverse Givens rotations have been performed on the copies of the intermediate rotated unitary matrix. Step 238 and step 240 may be performed for each of a plurality of inverse Givens rotation blocks that each include a plurality of mutually commutative inverse Givens rotations. The plurality of inverse Givens rotation blocks may be the Givens rotation blocks determined when computing the coordinate pair sequence. After step 238 and step 240 have been performed for each inverse Givens rotation block, the resulting intermediate rotated unitary matrix may be used as the rotated unitary matrix.

Figure 8E:
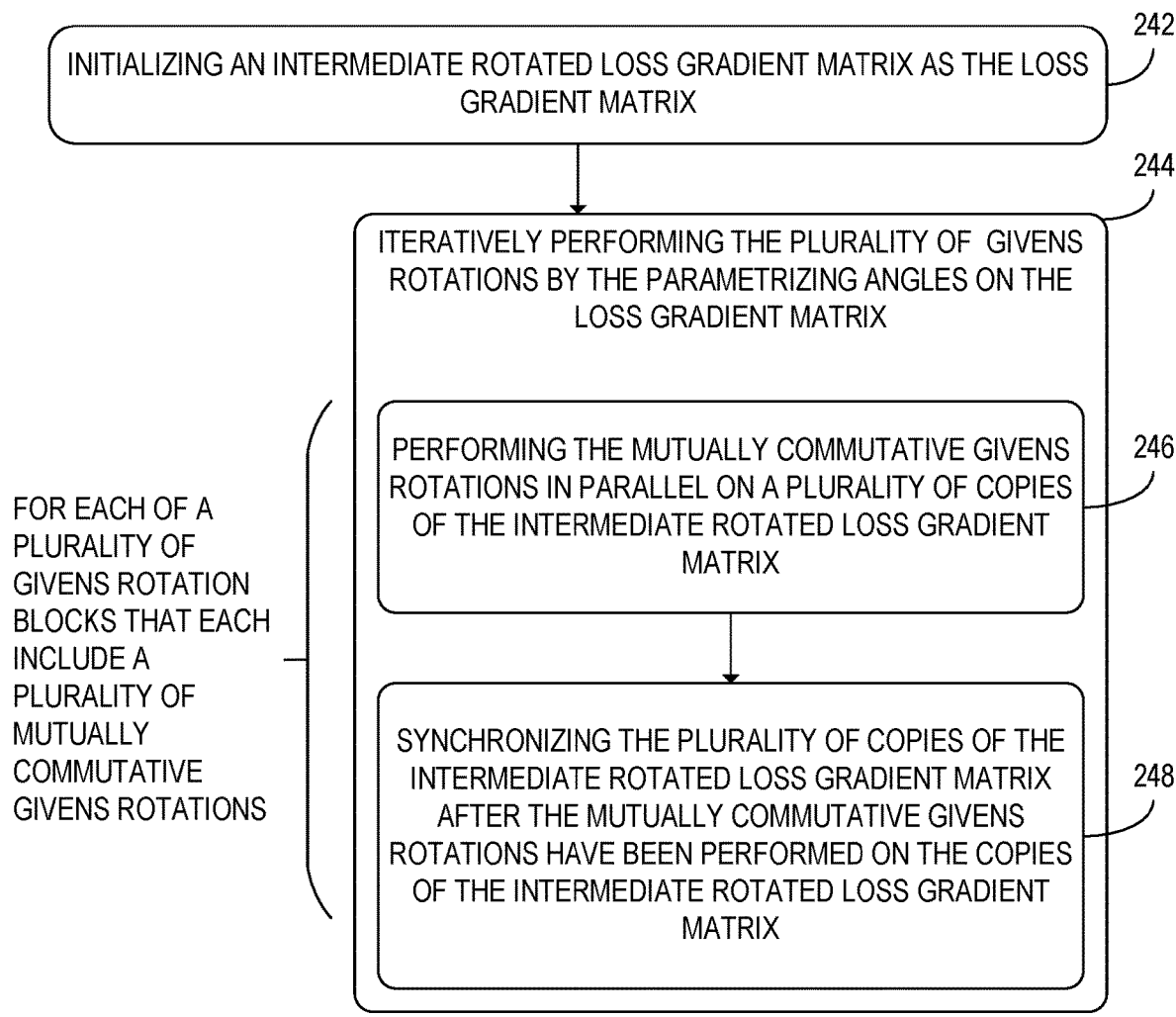
FIG. 8E shows additional steps of the method of FIG. 8A that may be performed when computing a rotated loss gradient matrix.

FIG. 8E shows additional steps of the method 200 that may be performed in some examples when computing the rotated loss gradient matrix at step 216. At step 242, the method 200 may include initializing an intermediate rotated loss gradient matrix as the loss gradient matrix. At step 244, the method 200 may further include iteratively performing the plurality of Givens rotations by the parametrizing angles on the loss gradient matrix. Step 244 may include, at step 246, performing the mutually commutative Givens rotations in parallel on a plurality of copies of the intermediate rotated loss gradient matrix. Step 244 may further include, at step 248, synchronizing the plurality of copies of the intermediate rotated loss gradient matrix after the mutually commutative Givens rotations have been performed on the copies of the intermediate rotated loss gradient matrix. Step 246 and step 248 may be performed for each of a plurality of Givens rotation blocks that each include a plurality of mutually commutative Givens rotations. After step 246 and step 248 have been performed for each Givens rotation block, the resulting intermediate rotated loss gradient matrix may be used as the rotated loss gradient matrix.

Figure 8F:
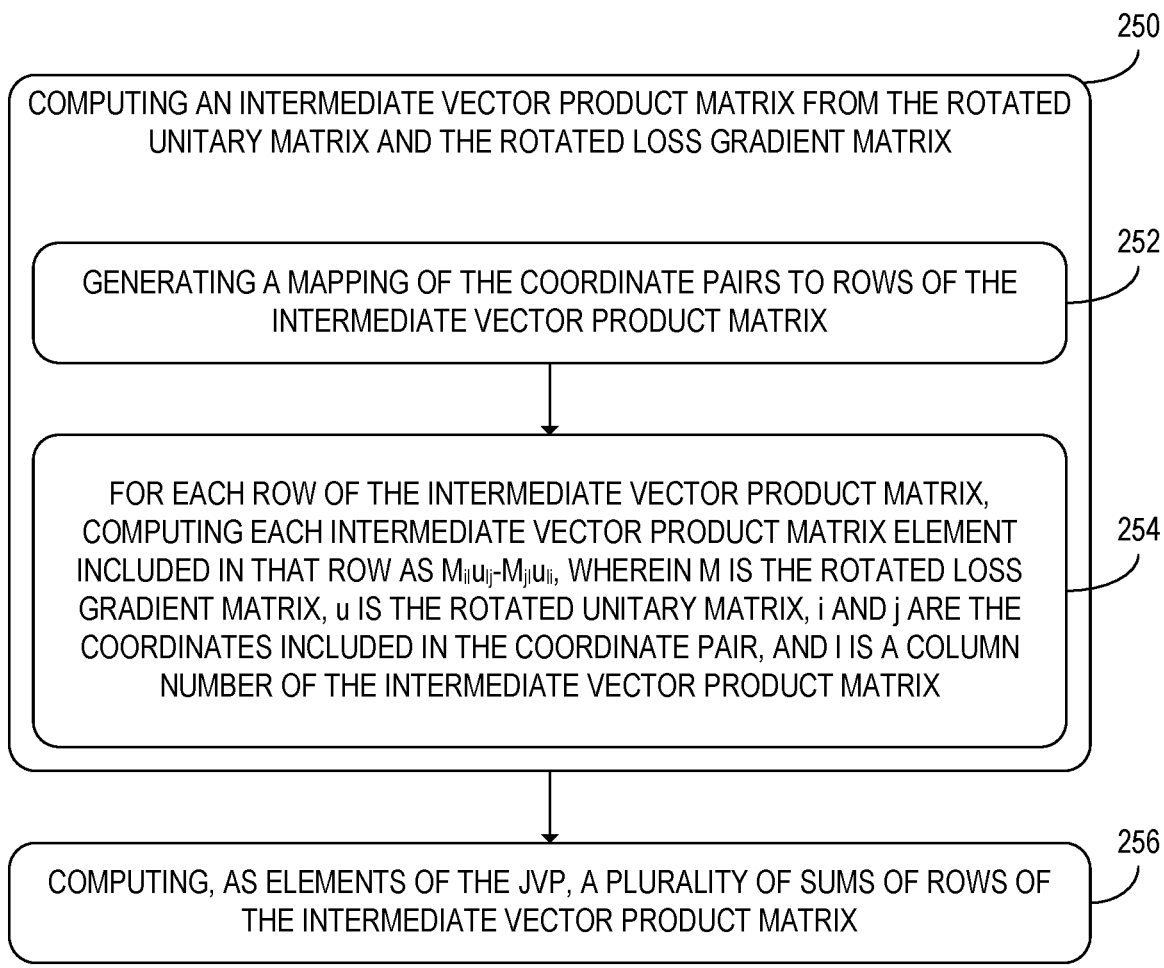
FIG. 8F shows additional steps of the method of FIG. 8A that may be performed when computing a JVP from a rotated unitary matrix and a rotated loss gradient matrix.

FIG. 8F shows additional steps of the method 200 that may be performed in some examples when computing the JVP from the rotated unitary matrix and the rotated loss gradient matrix at step 216. At step 250, the method 200 may include computing an intermediate vector product matrix from the rotated unitary matrix and the rotated loss gradient matrix. Computing the intermediate vector product matrix at step 250 may include, at step 252, generating a mapping of the coordinate pairs to rows of the intermediate vector product matrix. Computing the intermediate vector product matrix at step 250 may further include, at step 254, for each row of the intermediate vector product matrix, computing each intermediate vector product matrix element included in that row as $M_{il}u_{lj}-M_{jl}u_{li}$. In this expression for the intermediate vector product matrix elements, M is the rotated loss gradient matrix, u is the rotated unitary matrix, i and j are the coordinates included in the coordinate pair, and l is a column number of the intermediate vector product matrix. At step 256, the method 200 may further include computing, as elements of the JVP, a plurality of sums of rows of the intermediate vector product matrix. The sums of the rows of the intermediate vector product matrix may, for example, be computed by multiplying the intermediate vector product matrix by a vector of ones.

The techniques discussed above may allow the exploding and vanishing gradient problems to be avoided without relying on computationally expensive steps. Using the systems and methods discussed above, a machine learning model may be represented at least in part by a unitary matrix and may be trained in a plurality of backpropagation iterations. A unitary matrix may be generated from a plurality of parametrizing angles in O(n) time using the systems and methods discussed above. In addition, each of the backpropagation iterations may be performed in O(n log n) time, where n is the number of rows of the unitary matrix. Thus, the systems and methods discussed above may allow backpropagation to be performed efficiently even for large unitary matrices.

Figure 9A:
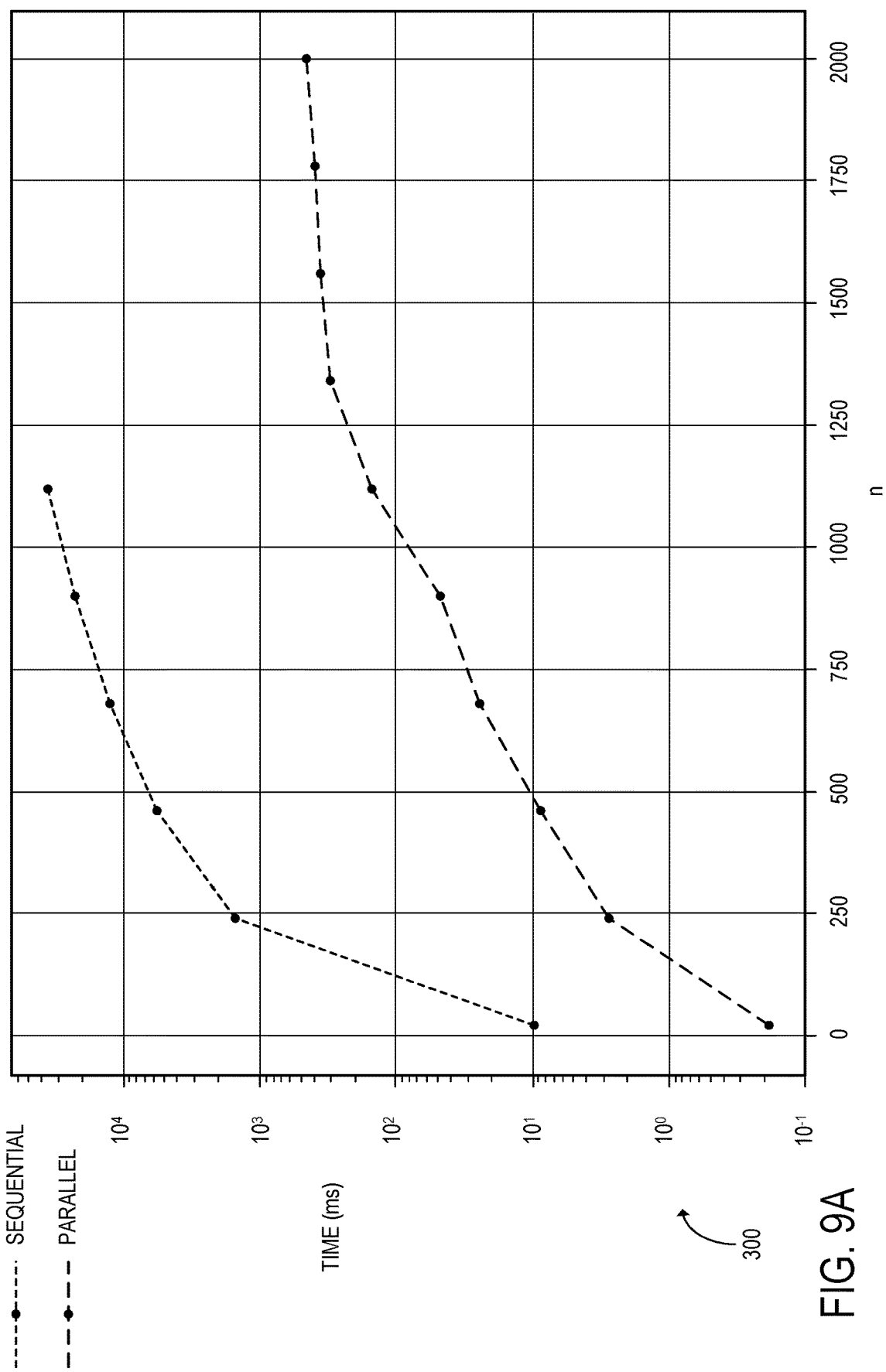
FIG. 9A shows a plot of execution time when computing a unitary matrix using a sequential algorithm and using a parallel algorithm, according to the example of FIG. 1A.
Figure 9B:
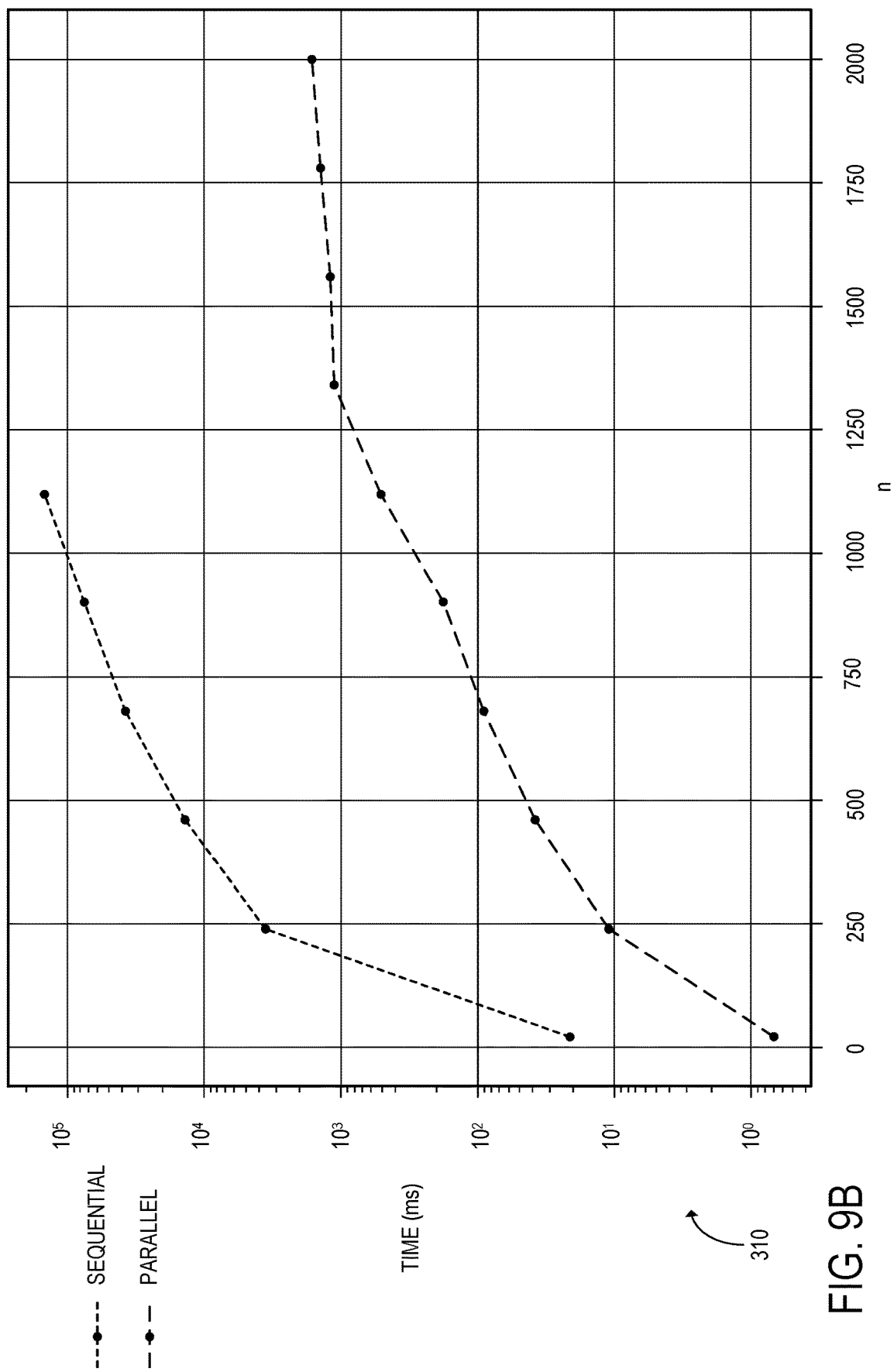
FIG. 9B shows a plot of execution time when computing a JVP using a sequential algorithm and using a parallel algorithm, according to the example of FIG. 1A.

FIG. 9A shows a plot 300 of execution time, in milliseconds, as a function of n when computing the unitary matrix U based on the plurality of parametrizing angles θ. In the example of FIG. 9A, corresponding execution times are shown for the first algorithm 100 (a sequential algorithm) and the second algorithm 110 (a parallel algorithm). In addition, FIG. 9B shows a plot 310 of execution time (in milliseconds) as a function of n when computing the JVP. In the example of FIG. 9B, corresponding execution times are shown for a sequential algorithm as well as for the third algorithm 120 (a parallel algorithm). The sequential algorithms were executed on a CPU and the parallel algorithms (the second algorithm 110 and the third algorithm 120) were executed on a GPU. As shown in the example of FIG. 9A, the parallel algorithms may allow computation of U and the JVP to be sped up by multiple orders of magnitude compared to the sequential algorithms for the tested values of n.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
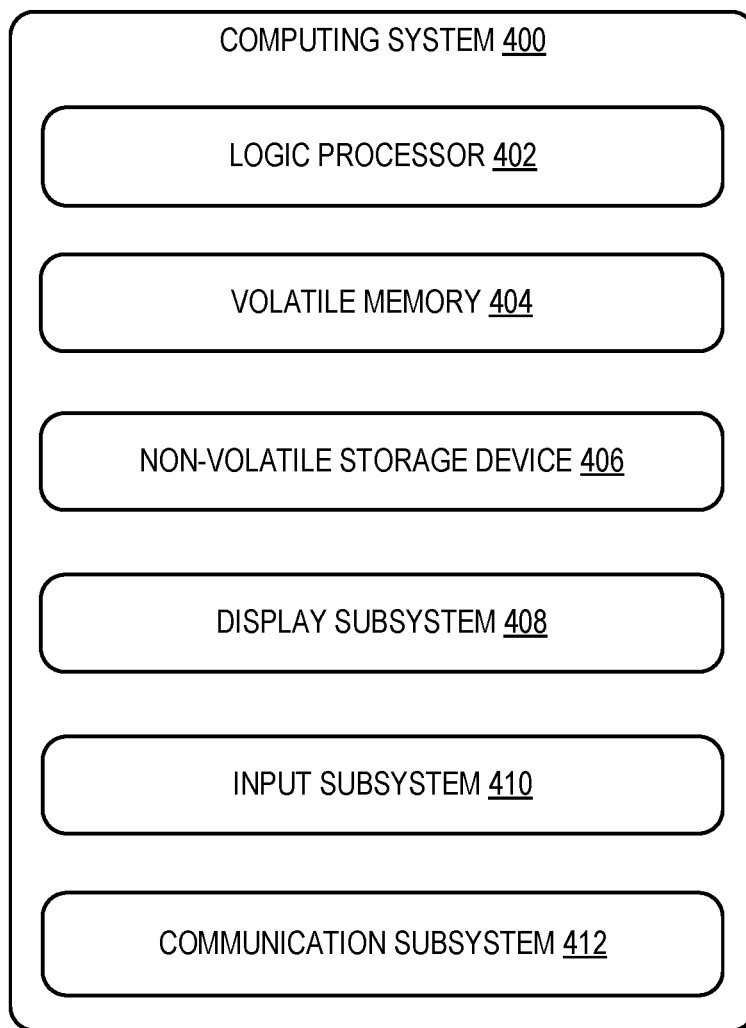
FIG. 10 shows a schematic view of an example computing environment in which the computing system of FIG. 1A may be enacted.

FIG. 10 schematically shows a non-limiting embodiment of a computing system 400 that can enact one or more of the methods and processes described above. Computing system 400 is shown in simplified form. Computing system 400 may embody the computing system 10 described above and illustrated in FIG. 1A. Components of the computing system 400 may be included in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 10.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include FPGAs, program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

The following paragraphs discuss several aspects of the present disclosure. According to one aspect of the present disclosure, a computing system is provided, including a processor configured to train a machine learning model in a plurality of backpropagation iterations. Each backpropagation iteration may include generating a coordinate pair sequence including a plurality of coordinate pairs. Each coordinate pair of the plurality of coordinate pairs may be unique within the coordinate pair sequence and may include non-matching coordinates. The backpropagation iteration may further include receiving a plurality of parametrizing angles respectively associated with the plurality of coordinate pairs. The backpropagation iteration may further include computing a unitary matrix parametrized by the plurality of parametrizing angles. The backpropagation iteration may further include computing a loss gradient matrix of a training loss with respect to a plurality of unitary matrix elements of the unitary matrix. The backpropagation iteration may further include computing a Jacobian-vector product (JVP) of the training loss with respect to the plurality of parametrizing angles. Computing the JVP may include computing a rotated unitary matrix by performing, on the unitary matrix, for each coordinate pair of the plurality of coordinate pairs, an inverse Givens rotation by the parametrizing angle for the coordinate pair around an axis specified by the coordinate pair. Computing the JVP may further include computing a rotated loss gradient matrix by performing, on the loss gradient matrix, for each coordinate pair of the plurality of coordinate pairs, a Givens rotation by the parametrizing angle for the coordinate pair around the axis specified by the coordinate pair. The JVP may be computed from the rotated unitary matrix and the rotated loss gradient matrix. The backpropagation iteration may further include updating the plurality of parametrizing angles based at least in part on the JVP.

According to this aspect, the processor may be configured to generate the coordinate pair sequence at least in part by, for an index sequence of n indices, where n is a number of rows of the unitary matrix, in each of a plurality of pairing iterations subsequent to an initial pairing iteration, shifting a respective position in the index sequence of each index other than a fixed index by 1 modulo n−1. In each pairing iteration of the plurality of pairing iterations, the processor may be further configured to generate the coordinate pair sequence at least in part by iteratively pairing a first unpaired index in the index sequence with a last unpaired index in the index sequence until the index sequence includes fewer than two unpaired indices. In each pairing iteration of the plurality of pairing iterations, the processor may be further configured to generate the coordinate pair sequence at least in part by adding each pair of indices to the coordinate pair sequence.

According to this aspect, the processor may be configured to compute the unitary matrix at least in part by iteratively performing the plurality of Givens rotations by the parametrizing angles on an identity matrix.

According to this aspect, the processor may be configured to compute the unitary matrix at least in part by initializing an intermediate unitary matrix as the identity matrix. The processor may be further configured to compute the unitary matrix at least in part by iteratively, for each of a plurality of Givens rotation blocks that each include a plurality of mutually commutative Givens rotations, performing the plurality of mutually commutative Givens rotations in parallel on a plurality of copies of the intermediate unitary matrix and synchronizing the plurality of copies of the intermediate unitary matrix after the mutually commutative Givens rotations have been performed on the copies of the intermediate unitary matrix.

According to this aspect, the processor may be configured to compute the rotated unitary matrix at least in part by initializing an intermediate rotated unitary matrix as the unitary matrix. The processor may be further configured to compute the rotated unitary matrix at least in part by iteratively, for each of a plurality of inverse Givens rotation blocks that each include a plurality of mutually commutative inverse Givens rotations, performing the mutually commutative inverse Givens rotations in parallel on a plurality of copies of the intermediate rotated unitary matrix and synchronizing the plurality of copies of the intermediate rotated unitary matrix after the mutually commutative inverse Givens rotations have been performed on the copies of the intermediate rotated unitary matrix.

According to this aspect, the processor may be configured to compute the rotated loss gradient matrix at least in part by initializing an intermediate rotated loss gradient matrix as the loss gradient matrix. The processor may be further configured to compute the rotated loss gradient matrix at least in part by iteratively, for each of a plurality of Givens rotation blocks that each include a plurality of mutually commutative Givens rotations, performing the mutually commutative Givens rotations in parallel on a plurality of copies of the intermediate rotated loss gradient matrix and synchronizing the plurality of copies of the intermediate rotated loss gradient matrix after the mutually commutative Givens rotations have been performed on the copies of the intermediate rotated loss gradient matrix.

According to this aspect, the processor may be configured to compute the loss gradient matrix via automatic differentiation of the training loss with respect to the unitary matrix elements of the unitary matrix.

According to this aspect, the processor may be configured to compute the JVP from the rotated unitary matrix and the rotated loss gradient matrix at least in part by computing an intermediate vector product matrix from the rotated unitary matrix and the rotated loss gradient matrix. The processor may be further configured to compute the JVP from the rotated unitary matrix and the rotated loss gradient matrix at least in part by computing, as elements of the JVP, a plurality of sums of rows of the intermediate vector product matrix.

According to this aspect, the processor may be configured to compute the intermediate vector product matrix at least in part by generating a mapping of the coordinate pairs to rows of the intermediate vector product matrix. The processor may be further configured to compute the intermediate vector product matrix at least in part by, for each row of the intermediate vector product matrix, computing each intermediate vector product matrix element included in that row as $M_{il}m_{lj}-M_{jl}u_{li}$, wherein M is the rotated loss gradient matrix, u is the rotated unitary matrix, i and j are the coordinates included in the coordinate pair, and l is a column number of the intermediate vector product matrix.

According to this aspect, the processor may be configured to compute the JVP with $O(n \log n)$ complexity.

According to another aspect of the present disclosure, a method of training a machine learning model is provided. The method may include, in each of a plurality of backpropagation iterations, generating a coordinate pair sequence including a plurality of coordinate pairs. Each coordinate pair of the plurality of coordinate pairs may be unique within the coordinate pair sequence and may include non-matching coordinates. The method may further include, in each of the plurality of backpropagation iterations, receiving a plurality of parametrizing angles respectively associated with the plurality of coordinate pairs. The method may further include, in each of the plurality of backpropagation iterations, computing a unitary matrix parametrized by the plurality of parametrizing angles. The method may further include, in each of the plurality of backpropagation iterations, computing a loss gradient matrix of a training loss with respect to a plurality of unitary matrix elements of the unitary matrix. The method may further include, in each of the plurality of backpropagation iterations, computing a Jacobian-vector product (JVP) of the training loss with respect to the plurality of parametrizing angles. Computing the JVP may include computing a rotated unitary matrix by performing, on the unitary matrix, for each coordinate pair of the plurality of coordinate pairs, an inverse Givens rotation by the parametrizing angle for the coordinate pair around an axis specified by the coordinate pair. Computing the JVP may further include computing a rotated loss gradient matrix by performing, on the loss gradient matrix, for each coordinate pair of the plurality of coordinate pairs, a Givens rotation by the parametrizing angle for the coordinate pair around the axis specified by the coordinate pair. The JVP may be computed from the rotated unitary matrix and the rotated loss gradient matrix. The method may further include, in each of the plurality of backpropagation iterations, updating the plurality of parametrizing angles based at least in part on the JVP.

According to this aspect, generating the coordinate pair sequence may include, for an index sequence of n indices, where n is a number of rows of the unitary matrix, in each of a plurality of pairing iterations subsequent to an initial pairing iteration, shifting a respective position in the index sequence of each index other than a fixed index by 1 modulo n−1. Generating the coordinate pair sequence may further include, in each of the plurality of pairing iterations, iteratively pairing a first unpaired index in the index sequence with a last unpaired index in the index sequence until the index sequence includes fewer than two unpaired indices. Generating the coordinate pair sequence may further include, in each of the plurality of pairing iterations, adding each pair of indices to the coordinate pair sequence.

According to this aspect, computing unitary matrix may include iteratively performing the plurality of Givens rotations by the parametrizing angles on an identity matrix.

According to this aspect, computing the unitary matrix may include initializing an intermediate unitary matrix as the identity matrix. Computing the unitary matrix may further include iteratively, for each of a plurality of Givens rotation blocks that each include a plurality of mutually commutative Givens rotations, performing the plurality of mutually commutative Givens rotations in parallel on a plurality of copies of the intermediate unitary matrix and synchronizing the plurality of copies of the intermediate unitary matrix after the mutually commutative Givens rotations have been performed on the copies of the intermediate unitary matrix.

According to this aspect, computing the rotated unitary matrix may include initializing an intermediate rotated unitary matrix as the unitary matrix. Computing the rotated unitary matrix may further include iteratively, for each of a plurality of inverse Givens rotation blocks that each include a plurality of mutually commutative inverse Givens rotations, performing the mutually commutative inverse Givens rotations in parallel on a plurality of copies of the intermediate rotated unitary matrix and synchronizing the plurality of copies of the intermediate rotated unitary matrix after the mutually commutative inverse Givens rotations have been performed on the copies of the intermediate rotated unitary matrix.

According to this aspect, computing the rotated loss gradient matrix may include initializing an intermediate rotated loss gradient matrix as the loss gradient matrix. Computing the rotated loss gradient matrix may further include iteratively, for each of a plurality of Givens rotation blocks that each include a plurality of mutually commutative Givens rotations, performing the mutually commutative Givens rotations in parallel on a plurality of copies of the intermediate rotated loss gradient matrix and synchronizing the plurality of copies of the intermediate rotated loss gradient matrix after the mutually commutative Givens rotations have been performed on the copies of the intermediate rotated loss gradient matrix.

According to this aspect, the loss gradient matrix may be computed via automatic differentiation of the training loss with respect to the unitary matrix elements of the unitary matrix.

According to this aspect, computing the JVP from the rotated unitary matrix and the rotated loss gradient matrix may include computing an intermediate vector product matrix from the rotated unitary matrix and the rotated loss gradient matrix. Computing the JVP from the rotated unitary matrix and the rotated loss gradient matrix may further include computing, as elements of the JVP, a plurality of sums of rows of the intermediate vector product matrix.

According to this aspect, computing the intermediate vector product matrix may include generating a mapping of the coordinate pairs to rows of the intermediate vector product matrix. Computing the intermediate vector product matrix may further include, for each row of the intermediate vector product matrix, computing each intermediate vector product matrix element included in that row as $M_{il}u_{lj}-M_{jl}u_{li}$, wherein M is the rotated loss gradient matrix, u is the rotated unitary matrix, i and j are the coordinates included in the coordinate pair, and l is a column number of the intermediate vector product matrix.

According to another aspect of the present disclosure, a computing system is provided, including a processor configured to train a machine learning model in a plurality of backpropagation iterations. Each backpropagation iteration may include, in a forward pass, computing a unitary matrix parametrized by a plurality of parametrizing angles at least in part by performing a plurality of Givens rotations in parallel. Each backpropagation iteration may further include, in a backward pass, computing a Jacobian-vector product (JVP) of a training loss with respect to the plurality of parametrizing angles at least in part by performing, in parallel, the plurality of Givens rotations on a loss gradient matrix and a plurality of inverse Givens rotations on the unitary matrix. Each backpropagation iteration may further include updating the plurality of parametrizing angles based at least in part on the JVP.

"And/or" as used herein is defined as the inclusive or ∨, as specified by the following truth table:

| A | B | A ∨ B |
| --- | --- | --- |
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A computing system comprising:
a processor configured to:
  train a machine learning model in a plurality of backpropagation iterations, wherein each backpropagation iteration includes:
    generating a coordinate pair sequence including a plurality of coordinate pairs, wherein each coordinate pair of the plurality of coordinate pairs is unique within the coordinate pair sequence and includes non-matching coordinates;
    receiving, as parameters of the machine learning model, a plurality of parametrizing angles respectively associated with the plurality of coordinate pairs;
    computing a unitary matrix parametrized by the plurality of parametrizing angles, wherein computing the unitary matrix includes:
      initializing an intermediate unitary matrix as an identity matrix;
      iteratively, for each of a plurality of Givens rotation blocks, wherein each of the Givens rotation blocks is a sequence of mutually commutative Givens rotations:
        performing the mutually commutative Givens rotations in parallel on a plurality of copies of the intermediate unitary matrix; and
        synchronizing the plurality of copies of the intermediate unitary matrix after the mutually commutative Givens rotations have been performed on the copies of the intermediate unitary matrix;

computing a loss gradient matrix of a training loss with respect to a plurality of unitary matrix elements of the unitary matrix;

computing a Jacobian-vector product (JVP) of the training loss with respect to the plurality of parametrizing angles, wherein computing the JVP includes:

computing a rotated unitary matrix by performing, on the unitary matrix, for each coordinate pair of the plurality of coordinate pairs, an inverse Givens rotation by the parametrizing angle for the coordinate pair around an axis specified by the coordinate pair;

computing a rotated loss gradient matrix by performing, on the loss gradient matrix, for each coordinate pair of the plurality of coordinate pairs, a Givens rotation by the parametrizing angle for the coordinate pair around the axis specified by the coordinate pair; and computing the JVP from the rotated unitary matrix and the rotated loss gradient matrix; and updating the plurality of parametrizing angles based at least in part on the JVP to thereby train the machine learning model.

2. The computing system of claim 1, wherein the processor is configured to generate the coordinate pair sequence at least in part by:

for an index sequence of n indices, where n is a number of rows of the unitary matrix:
in each of a plurality of pairing iterations:
in each pairing iteration subsequent to an initial pairing iteration, shifting a respective position in the index sequence of each index other than a fixed index by 1 modulo n−1;
iteratively pairing a first unpaired index in the index sequence with a last unpaired index in the index sequence until the index sequence includes fewer than two unpaired indices; and
adding each pair of indices to the coordinate pair sequence.

3. The computing system of claim 1, wherein the processor is configured to compute the rotated unitary matrix at least in part by:

initializing an intermediate rotated unitary matrix as the unitary matrix; and
iteratively, for each of a plurality of inverse Givens rotation blocks that each include a plurality of mutually commutative inverse Givens rotations:
performing the mutually commutative inverse Givens rotations in parallel on a plurality of copies of the intermediate rotated unitary matrix; and
synchronizing the plurality of copies of the intermediate rotated unitary matrix after the mutually commutative inverse Givens rotations have been performed on the copies of the intermediate rotated unitary matrix.

4. The computing system of claim 1, wherein the processor is configured to compute the rotated loss gradient matrix at least in part by:

initializing an intermediate rotated loss gradient matrix as the loss gradient matrix; and
iteratively, for each of a plurality of Givens rotation blocks that each include a plurality of mutually commutative Givens rotations:

performing the mutually commutative Givens rotations in parallel on a plurality of copies of the intermediate rotated loss gradient matrix; and
synchronizing the plurality of copies of the intermediate rotated loss gradient matrix after the mutually commutative Givens rotations have been performed on the copies of the intermediate rotated loss gradient matrix.

5. The computing system of claim 1, wherein the processor is configured to compute the loss gradient matrix via automatic differentiation of the training loss with respect to the unitary matrix elements of the unitary matrix.

6. The computing system of claim 1, wherein the processor is configured to compute the JVP from the rotated unitary matrix and the rotated loss gradient matrix at least in part by:

computing an intermediate vector product matrix from the rotated unitary matrix and the rotated loss gradient matrix; and
computing, as elements of the JVP, a plurality of sums of rows of the intermediate vector product matrix.

7. The computing system of claim 6, wherein the processor is configured to compute the intermediate vector product matrix at least in part by:

generating a mapping of the coordinate pairs to rows of the intermediate vector product matrix; and
for each row of the intermediate vector product matrix, computing each intermediate vector product matrix element included in that row as $M_{il}u_{lj}-M_{jl}u_{li}$, wherein M is the rotated loss gradient matrix, u is the rotated unitary matrix, i and j are the coordinates included in the coordinate pair, and l is a column number of the intermediate vector product matrix.

8. The computing system of claim 1, wherein the processor is configured to compute the JVP with O(n log n) complexity.

9. A method of training a machine learning model, the method comprising, in each of a plurality of backpropagation iterations:

generating a coordinate pair sequence including a plurality of coordinate pairs, wherein each coordinate pair of the plurality of coordinate pairs is unique within the coordinate pair sequence and includes non-matching coordinates;

receiving, as parameters of the machine learning model, a plurality of parametrizing angles respectively associated with the plurality of coordinate pairs;

computing a unitary matrix parametrized by the plurality of parametrizing angles, wherein computing the unitary matrix includes:

initializing an intermediate unitary matrix as an identity matrix;
iteratively, for each of a plurality of Givens rotation blocks, wherein each of the Givens rotation blocks is a sequence of mutually commutative Givens rotations:
performing the mutually commutative Givens rotations in parallel on a plurality of copies of the intermediate unitary matrix; and
synchronizing the plurality of copies of the intermediate unitary matrix after the mutually commutative Givens rotations have been performed on the copies of the intermediate unitary matrix;

computing a loss gradient matrix of a training loss with respect to a plurality of unitary matrix elements of the unitary matrix;

computing a Jacobian-vector product (JVP) of the training loss with respect to the plurality of parametrizing angles, wherein computing the JVP includes:

computing a rotated unitary matrix by performing, on the unitary matrix, for each coordinate pair of the plurality of coordinate pairs, an inverse Givens rotation by the parametrizing angle for the coordinate pair around an axis specified by the coordinate pair;

computing a rotated loss gradient matrix by performing, on the loss gradient matrix, for each coordinate pair of the plurality of coordinate pairs, a Givens rotation by the parametrizing angle for the coordinate pair around the axis specified by the coordinate pair; and computing the JVP from the rotated unitary matrix and the rotated loss gradient matrix; and updating the plurality of parametrizing angles based at least in part on the JVP to thereby train the machine learning model.

10. The method of claim 9, wherein generating the coordinate pair sequence includes:

for an index sequence of n indices, where n is a number of rows of the unitary matrix:
in each of a plurality of pairing iterations:
in each pairing iteration subsequent to an initial pairing iteration, shifting a respective position in the index sequence of each index other than a fixed index by 1 modulo n−1;
iteratively pairing a first unpaired index in the index sequence with a last unpaired index in the index sequence until the index sequence includes fewer than two unpaired indices; and
adding each pair of indices to the coordinate pair sequence.

11. The method of claim 9, wherein computing the rotated unitary matrix includes:

initializing an intermediate rotated unitary matrix as the unitary matrix; and
iteratively, for each of a plurality of inverse Givens rotation blocks that each include a plurality of mutually commutative inverse Givens rotations:
performing the mutually commutative inverse Givens rotations in parallel on a plurality of copies of the intermediate rotated unitary matrix; and
synchronizing the plurality of copies of the intermediate rotated unitary matrix after the mutually commutative inverse Givens rotations have been performed on the copies of the intermediate rotated unitary matrix.

12. The method of claim 9, wherein computing the rotated loss gradient matrix includes:

initializing an intermediate rotated loss gradient matrix as the loss gradient matrix; and
iteratively, for each of a plurality of Givens rotation blocks that each include a plurality of mutually commutative Givens rotations:
performing the mutually commutative Givens rotations in parallel on a plurality of copies of the intermediate rotated loss gradient matrix; and
synchronizing the plurality of copies of the intermediate rotated loss gradient matrix after the mutually commutative Givens rotations have been performed on the copies of the intermediate rotated loss gradient matrix.

13. The method of claim 9, wherein the loss gradient matrix is computed via automatic differentiation of the training loss with respect to the unitary matrix elements of the unitary matrix.

14. The method of claim 9, wherein computing the JVP from the rotated unitary matrix and the rotated loss gradient matrix includes:

computing an intermediate vector product matrix from the rotated unitary matrix and the rotated loss gradient matrix; and
computing, as elements of the JVP, a plurality of sums of rows of the intermediate vector product matrix.

15. The method of claim 14, wherein computing the intermediate vector product matrix includes:

generating a mapping of the coordinate pairs to rows of the intermediate vector product matrix; and
for each row of the intermediate vector product matrix, computing each intermediate vector product matrix element included in that row as $M_{il}u_{lj} - M_{jl}u_{li}$, wherein M is the rotated loss gradient matrix, u is the rotated unitary matrix, i and j are the coordinates included in the coordinate pair, and l is a column number of the intermediate vector product matrix.

16. A computing system comprising:
a processor configured to:
train a machine learning model in a plurality of backpropagation iterations, wherein each backpropagation iteration includes:
in a forward pass, computing a unitary matrix parametrized by a plurality of parametrizing angles, wherein:
the parametrizing angles are parameters of the machine learning model; and
computing the unitary matrix includes:
initializing an intermediate unitary matrix as an identity matrix;
iteratively, for each of a plurality of Givens rotation blocks, wherein each of the Givens rotation blocks is a sequence of mutually commutative Givens rotations:
performing the mutually commutative Givens rotations in parallel on a plurality of copies of the intermediate unitary matrix; and
synchronizing the plurality of copies of the intermediate unitary matrix after the mutually commutative Givens rotations have been performed on the copies of the intermediate unitary matrix; and
in a backward pass:
computing a Jacobian-vector product (JVP) of a training loss with respect to the plurality of parametrizing angles at least in part by performing, in parallel, the plurality of Givens rotations on a loss gradient matrix and a plurality of inverse Givens rotations on the unitary matrix; and
updating the plurality of parametrizing angles based at least in part on the JVP to thereby train the machine learning model.

* * * * *